(12) United States Patent
Verresen et al.

(10) Patent No.: US 12,067,461 B2
(45) Date of Patent: Aug. 20, 2024

(54) FAST PREPARATION OF HIGHLY-ENTANGLED QUANTUM STATES

(71) Applicant: President and Fellows of Harvard College, Cambridge, MA (US)

(72) Inventors: Ruben Verresen, Cambridge, MA (US); Nathanan Tantivasadakarn, Cambridge, MA (US); Ashvin Vishwanath, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 85 days.

(21) Appl. No.: 17/991,935

(22) Filed: Nov. 22, 2022

(65) Prior Publication Data
US 2023/0162081 A1   May 25, 2023

Related U.S. Application Data

(60) Provisional application No. 63/282,873, filed on Nov. 24, 2021, provisional application No. 63/296,715, filed on Jan. 5, 2022.

(51) Int. Cl.
*G06N 10/40* (2022.01)
*G06N 10/20* (2022.01)

(52) U.S. Cl.
CPC .......... *G06N 10/40* (2022.01); *G06N 10/20* (2022.01)

(58) Field of Classification Search
CPC ................ G06N 10/40; G06N 10/20
See application file for complete search history.

(56) References Cited

U.S. PATENT DOCUMENTS 7,836,007 B2 *  11/2010  Beausoleil ............. B82Y 10/00
706/62

* cited by examiner

*Primary Examiner* — G. M. A Hyder
(74) *Attorney, Agent, or Firm* — Foley Hoag LLP; Alexander Akhiezer; Erik A. Huestis

(57) ABSTRACT

A method of preparing an entangled state of a plurality of qubits. The method comprises: (i) preparing an array of qubits, each qubit being in a ground qubit state and having an excited qubit state. The array comprises a plurality of first qubits and a plurality of second qubits, each first qubit disposed at a vertex of a first lattice, each second qubit disposed at a vertex of a second lattice, wherein each first qubit has at least one nearest neighbor second qubit, wherein for any two first qubits, a spacing between said first qubits and their respective nearest neighbor second qubits is the same, each first qubit capable of having an Ising interaction with its nearest neighbor second qubit; (ii) causing a single-site rotation of the plurality of the first qubits and of the plurality of the second qubits, thereby causing each first and each second qubit to transition into a superposition of the ground qubit state and the excited qubit state; (iii) evolving the array of qubits for a pre-determined time $\tau$, thereby producing a cluster state of the array of qubits; and (iv) measuring the state of each first qubit, wherein the measuring comprises reversing the single-site rotation of the plurality of the first qubits, thereby preparing an entangled state of the plurality of second qubits.

22 Claims, 37 Drawing Sheets

From appendix c, originally not numbered

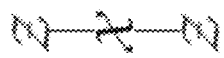
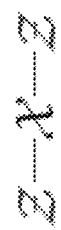
FIG. 12
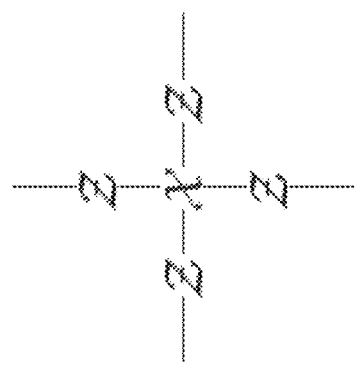

$$\frac{1}{3}\left[1 + \left(Z_1 Z_2^{Z_4} Z_3^{Z_4} Z_4 + h.c.\right)\right]$$

$$\frac{1}{2}\left[1 + Z Z Z Z\right]$$

FIG. 25

FAST PREPARATION OF HIGHLY-ENTANGLED QUANTUM STATES

RELATED APPLICATIONS

This application claims the benefit of U.S. Provisional Application No. 63/282,873, filed on Nov. 24, 2021, and U.S. Provisional Application No. 63/296,715, filed on Jan. 5, 2022. The entire teachings of the above applications are incorporated herein by reference.

BACKGROUND

Highly entangled quantum states are useful in such application as quantum computing ad quantum metrology. Producing such quantum states remain a challenge.

SUMMARY OF THE INVENTION

In an example embodiment, the present invention is a method of preparing an entangled state of a plurality of qubits. The method comprises: preparing an array of qubits, each qubit being in a ground qubit state and having an excited qubit state, the array comprising: a plurality of first qubits and a plurality of second qubits, each first qubit disposed at a vertex of a first lattice, each second qubit disposed at a vertex of a second lattice, wherein each first qubit has at least one nearest neighbor second qubit, wherein for any two first qubits, a spacing between said first qubits and their respective nearest neighbor second qubits is the same. The method further comprises: -causing a first single-site rotation of the plurality of the first qubits and of the plurality of the second qubits, thereby causing each first and each second qubit to transition into a superposition of the ground qubit state and the excited qubit state; -evolving the array of qubits for a pre-determined time $\tau$, thereby producing a cluster state of the array of qubits; and —measuring the state of each first qubit, wherein the measuring comprises reversing the single-site rotation of the plurality of the first qubits, thereby preparing an entangled state of the plurality of second qubits.

In another example embodiment, the present invention is a method of preparing an entangled state of a plurality of qubits. The method comprises preparing an array of qubits, each qubit having a first state and a second state, the array comprising: a plurality of first qubits and a plurality of second qubits, wherein each first qubit has at least one neighboring second qubit, wherein each first qubit is controllably in communication with its respective neighboring second qubits. The method further comprises: -causing each second qubit to transition into a superposition of the first state and the second state, thereby preparing a product state; -applying a controlled-Z gate to each of the first qubits and its nearest neighbor second qubit; and —measuring the state of each first qubit, thereby preparing an entangled state of the plurality of second qubits.

In another example embodiment, the present invention is a method of preparing an entangled state of a plurality of qubits. The method comprises preparing an array of qubits, each qubit having a ground qubit state and an excited qubit state, the array comprising: a plurality of first qubits and a plurality of second qubits, each first qubit disposed at a vertex of a first lattice, each second qubit disposed at a vertex of a second lattice, wherein each first qubit has at least one nearest neighbor second qubit, wherein for any two first qubits, a spacing between said first qubits and their respective nearest neighbor second qubits is the same, wherein the plurality of the first qubits is in an "input" state, and each of the plurality of second qubits is in the ground state. The method further comprises: -causing a single-site rotation of the plurality of the second qubits, thereby causing each second qubit to transition into a superposition of the ground qubit state and the excited qubit state; -evolving the array of qubits for a pre-determined time $\tau$, thereby producing an entangled state of the plurality of the first qubits and the plurality of the second qubits; and —measuring the state of each first qubit, wherein the measuring comprises applying a second single-site rotation of the plurality of the first qubits, thereby preparing an output state of the plurality of the second qubits.

In another example embodiment, the present invention is a device, comprising an array of qubits, each qubit having a ground qubit state and having an excited qubit state, the array comprising: a plurality of first qubits and a plurality of second qubits, each first qubit disposed at a vertex of a first lattice, each second qubit disposed at a vertex of a second lattice, wherein each first qubit has at least one nearest neighbor second qubit, wherein for any two first qubits, a spacing between said first qubits and their respective nearest neighbor second qubits is the same. At least some of the plurality of second qubits is in a GHZ state, and the fidelity of the Greenberger-Horne-Zeilinger (GHZ) state per site is at least 0.99.

BRIEF DESCRIPTION OF THE DRAWINGS

FIG. 12 shows a stabilizer used for preparation of $S_3$ topological order.

FIG. 24 and FIG. 25 collectively depict projectors related to the quantum double model D(S3).

DETAILED DESCRIPTION OF THE INVENTION

Figure 1A:
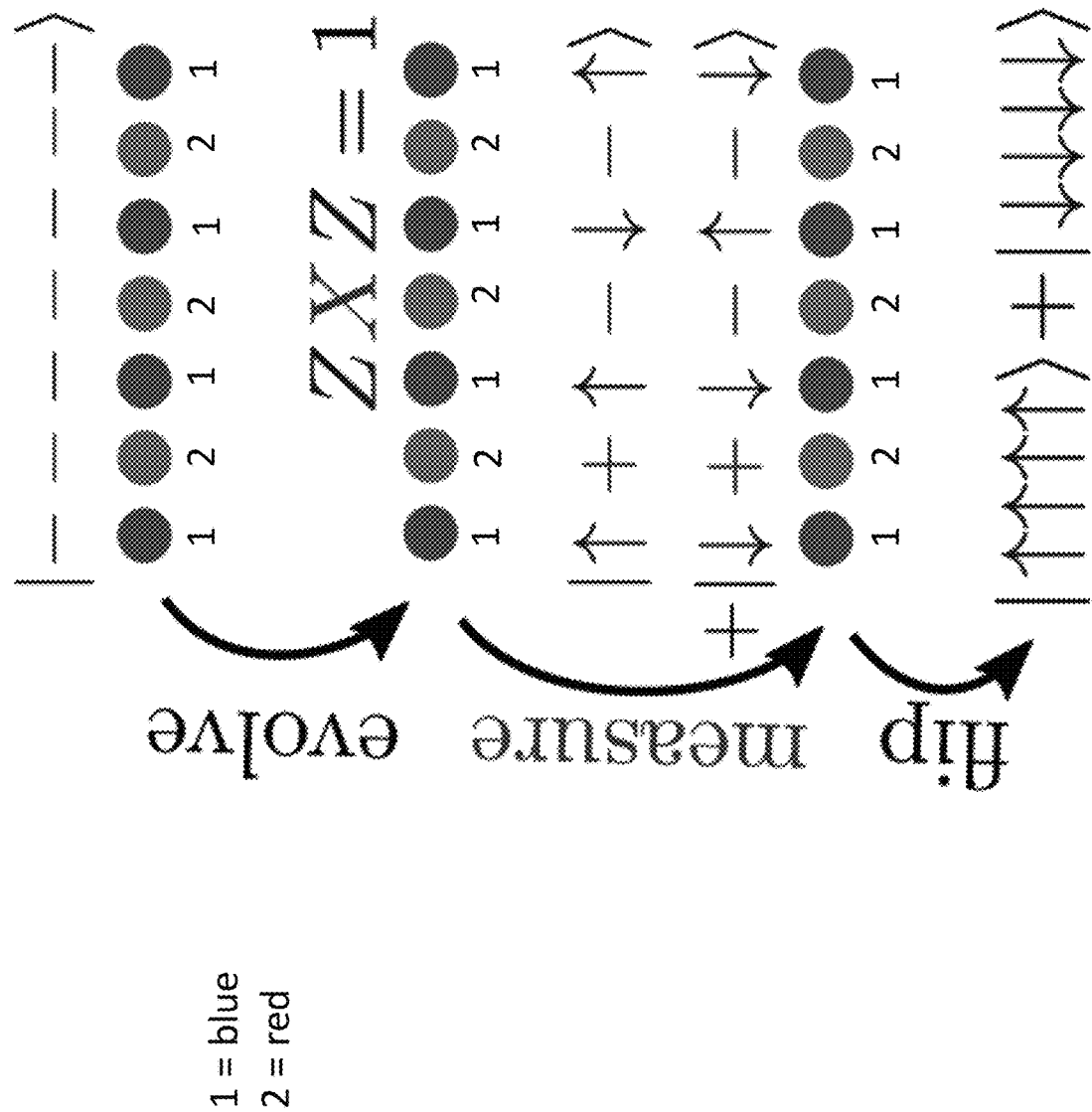
FIG. 1A, FIG. 1B, FIG. 1C, and FIG. 1D collectively illustrate a protocol for fast preparation of GHZ state by measuring 1D cluster state.
Figure 1B:
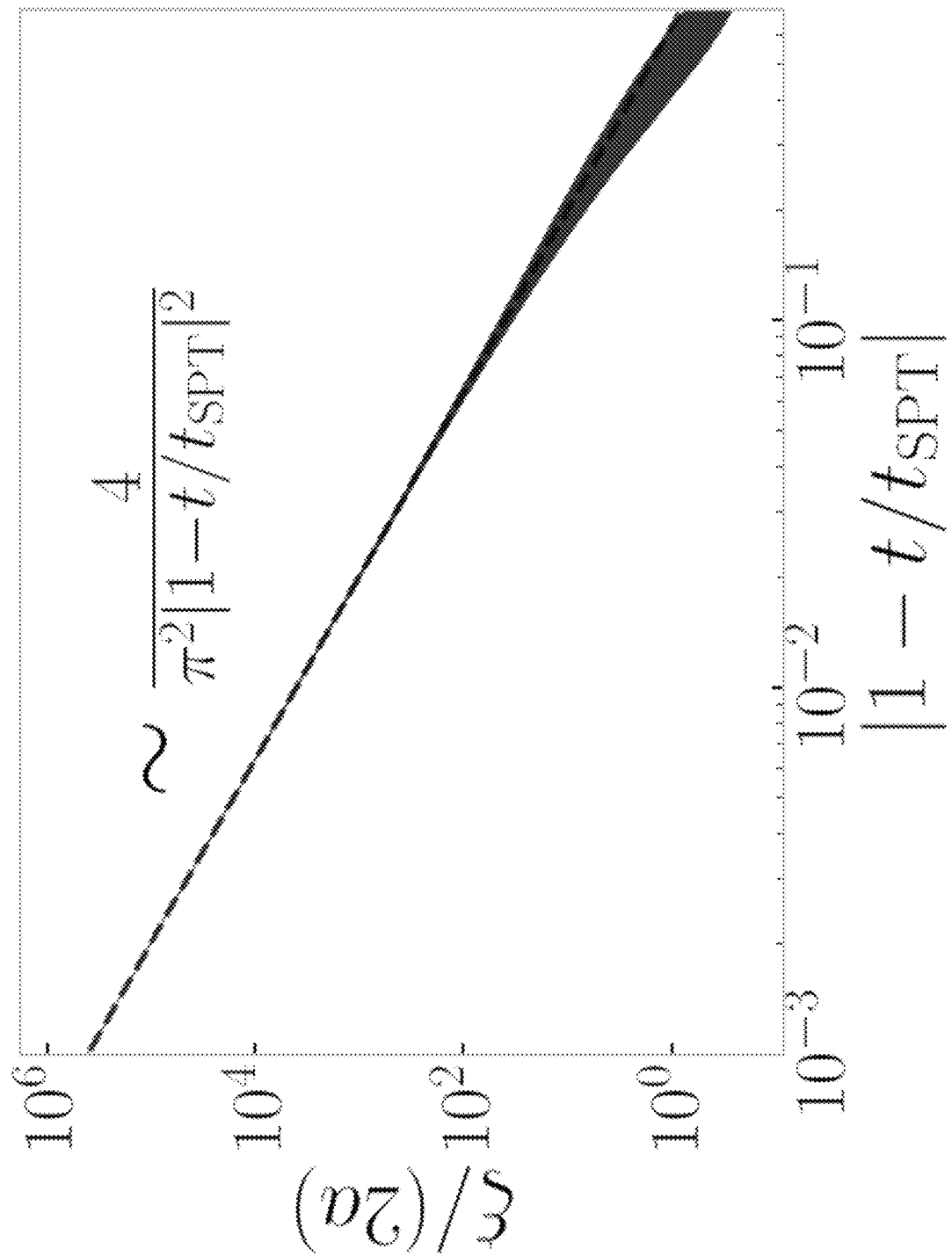
Figure 1C:
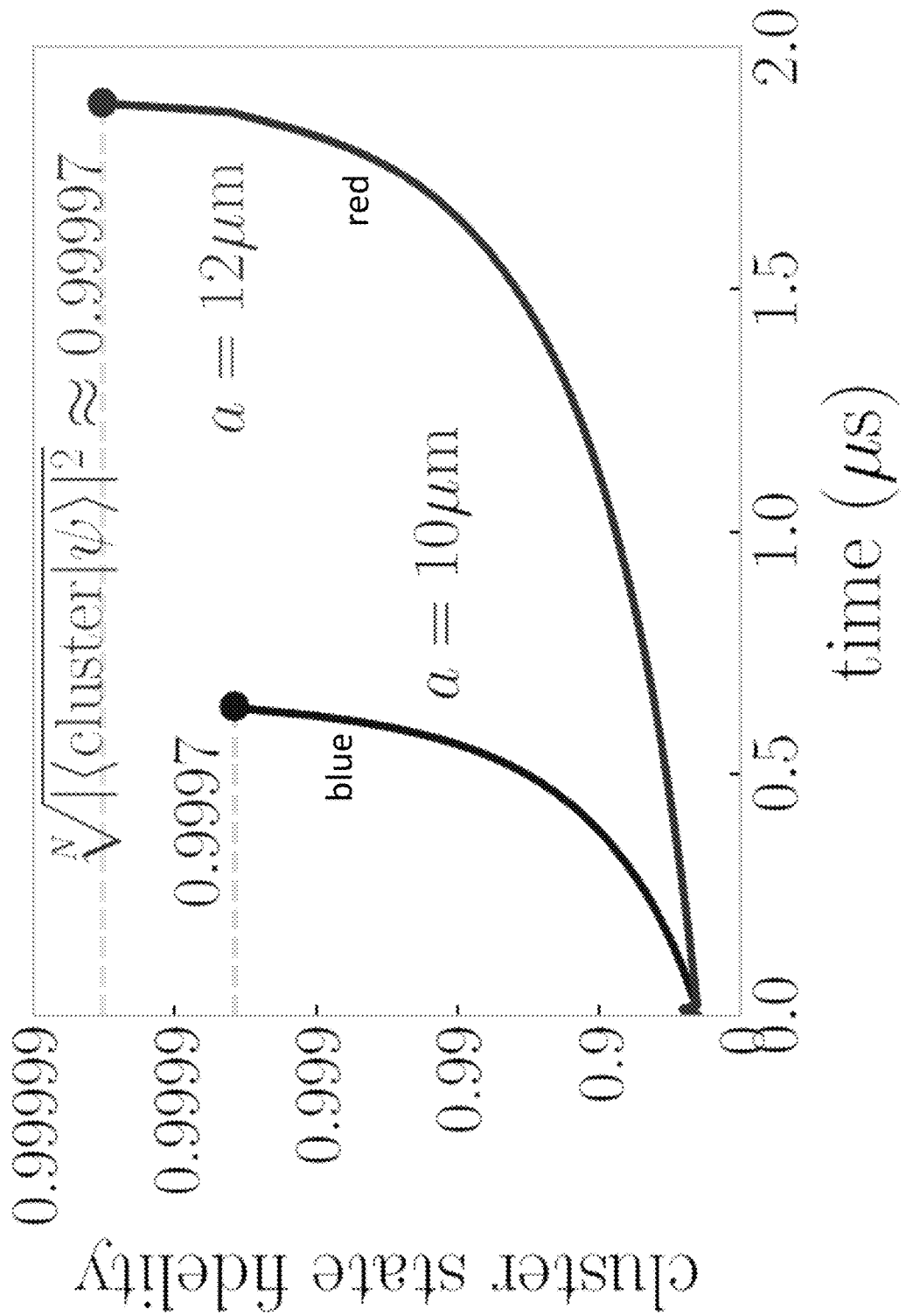
Figure 1D:
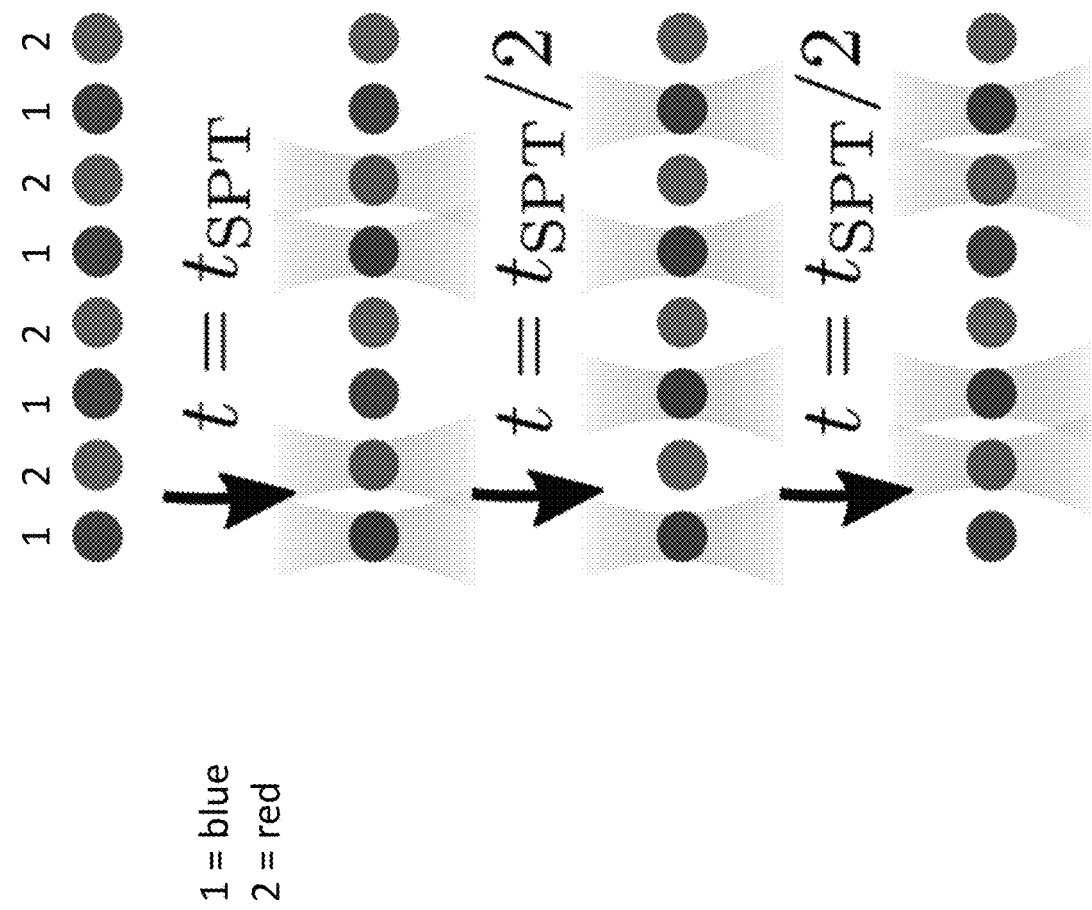

As used herein, a "lattice" can be a unidimensional, a two-dimensional, or a three-dimensional lattice.

As used herein, a "qubit" refers to any physical implementation of a quantum mechanical object that can be in any one of at least two states or any superposition thereof. In certain embodiments, a qubit includes a qutrit, i.e. a quantum mechanical object that can be in any one of three states or any superposition thereof. Physical implementations of a qubit include neutral atoms, ions, superconducting electronic circuit, etc.

As used herein, the phrase "nearest neighbor(s)" of a given site in one sublattice is defined as the collection of sites in the other sublattice with the shortest distance to said site.

A description of example embodiments of the invention is provided below.

Long-range entangled quantum states—like cat states and topological order—are key for quantum metrology and information purposes, but they cannot be prepared by any scalable unitary process. Intriguingly, using measurements as an additional ingredient could circumvent such no-go theorems. However, efficient schemes are known for only a limited class of long-range entangled states, and their implementation on existing quantum devices via a sequence of gates and measurements is hampered by high overheads. Described herein is a method and a device that resolve these problems, implementing scalable preparation of a broad range of long-range entangled states with the use of existing experimental platforms. The two-step process described herein can be implemented in Rydberg atom arrays, only requiring time-evolution under the intrinsic atomic interactions, followed by measuring a single sub-lattice (by using, e.g., two atom species). Remarkably, this protocol can prepare the 1D Greenberger-Horne-Zeilinger (GHZ) 'cat' state and 2D toric code with fidelity per site exceeding 0.9999, and a 3D fracton state with fidelity ≳0.998. In light of recent experiments showcasing 3D Rydberg atom arrays, this paves the way to the first experimental realization of fracton order. In addition to the examples based on efficiently preparing and measuring cluster states, also proposed herein is a multi-step procedure to create $S_3$ and $D_4$ non-Abelian topological order in Rydberg atom arrays and other quantum devices —offering a route towards universal topological quantum computation.

The defining property of long-range entangled states is that they cannot be prepared efficiently by unitary processes, that is, prepared within a fixed time window independent of system size. Remarkably, measurements can circumvent this issue in quantum devices. In particular, certain long-range entangled states can in principle be prepared in a fixed amount of time by first acting with simple quantum gates (typically controlled-Z or Ising)—preparing the so-called cluster state. Subsequently measuring a subset of quantum bits leaves the remainder in a long-range entangled state.

Referring now to FIGS. 1A through 1D, which illustrate a protocol for fast preparation of a GHZ state by measuring 1D cluster state. Panel (a) shows that the protocol starts with a product state in the X-basis which we let time-evolve under an Ising interaction. After a time $t=t_{SPT}$, this produces the cluster state. Measuring the red sites in the X-basis leads to a cat state. Using the information of the measurement outcomes, one can flip the appropriate spins to obtain the GHZ state on the blue sites. Panel (b) If no time-evolution is performed with exactly $t=t_{SPT}$, the post-measurement state is only an approximate cat state. Nevertheless, the resulting correlation length (within which there is long-range order) is very large even for moderate time deviations. Panel (c) describes a tensor-network simulation of the protocol for Rydberg atoms interacting with a $1/r^6$ van der Waals interaction. This simulation was done for Rb $70S_{1/2}$ with two different lattice spacings, which give different results due to incorporating the fact that the initial product state preparation pulses are not instantaneous. Panel (d) describes contributions from longer-range van der Waals interactions can be systematically suppressed by interspersing time-evolution with X-pulses (orange) on particular sublattices. This particular example cancels out couplings at distance r=2a, although this was not used to achieve the results in (c).

Some well-known examples are the cluster state on a 1D chain or the 2D Lieb lattice, where single-site measurements transform these into the GHZ 'cat' state or the toric code, respectively. However, even these known cases have resisted experimental implementation. Indeed, the infrastructure necessary to apply such quantum gates can require a high overhead, and setting aside a fraction of the qubits to be measured is costly in emerging quantum computers—with recent realizations of the toric code phase on quantum devices opting for a unitary protocol. Moreover, going beyond such known examples, an important open question is what other exotic state with potentially valuable properties could be prepared within a measurement-based protocol.

In the present disclosure, both these issues are being addressed. In terms of novel examples, 3D cluster states are being presented where single-site measurements produce the elusive fracton order—an intriguing family of 3D states which have resisted experimental detection and hold promise as optimal quantum hard drives. Moreover, going beyond the cluster state framework, there is disclosed a method of obtaining a non-Abelian topological order via multiple alternations between gates and measurements, establishing the first proposal for efficiently obtaining such an exotic state in any platform. The second issue addressed is that of implementability: all of the aforementioned examples—old and new—can be realized using existing Rydberg atom technology. In particular, the entangling operations are permitted to naturally emerge from the time-evolution under the intrinsic interactions between Rydberg atoms, rather than constructed piecemeal via the gates of a quantum computer, thereby trading in the overhead of the latter for scalability.

Rydberg atom arrays offer an ideal platform satisfying the two requirements of Ising interactions and high-resolution measurements. These are tunable lattices of atoms trapped by optical tweezers, each serving as an effective qubit consisting of its ground state (n=0) and a particular Rydberg excited state (n=1). When two atoms are simultaneously excited, they experience a van der Waals interaction V(r) ~$1/r^6$, giving rise to a Hamiltonian of the form:

$$H = \sum_i \frac{\Omega_i}{2} X_i - \sum_i \delta_i n_i + \frac{1}{2} \sum_{i \neq j} V_{ij} n_i n_j, \quad \text{Equation 1}$$

where X, Y, Z denote the Pauli matrices. Here $\Omega_i$ and $\delta_i$ are tuneable, and by shifting the latter, we obtain an explicit Ising interaction $$\frac{1}{2} \sum_{i \neq j} J_{ij} Z_i Z_j \text{ with } J_{ij} = \frac{1}{4} V_{ij},$$

which will play the role of our 'entangling gates'. Recent years have seen a rapid growth in available system sizes, exploring the many-body quantum physics of Equation 1 in 1D and 2D arrays of many hundreds of atoms, and even demonstrating 3D arrays. Confirming the platform's promise for realizing exotic states was recently established the onset of toric code topological order.

In the simplest instances, the state preparation procedure is a two-step protocol of time-evolution and measurement. At the end of the first step, high-quality cluster states are obtained despite the longer-range van der Waals corrections. This is due to a judicious choice of lattices, as well as reinterpreting the power of cluster states as being a property of their symmetry-protected topological (SPT) phase. While cluster states are already of interest (serving as resources for measurement-based quantum computation), to produce long-range entanglement an ability to measure only a subsystem of its atoms is needed. Recent breakthrough experiments have established that this is possible in dual-species arrays, where one species is transparent to measurements of the other. This way, the 1D GHZ, the 2D tonic code and 3D fracton states are produced.

Non-Abelian $D_4$ or $S_3$ topological order can be obtained by using a four-step protocol where one time-evolves and measures twice, creating the color code or $Z_3$ toric code as an intermediate state. This can be conceptually interpreted as sequentially gauging certain symmetries, thereby expanding the possible states of matter which can be efficiently prepared by finite-time evolution and measurement.

The 1D Cluster and Ghz States

To describe how to efficiently prepare a Schrödinger cat state, first consider the idealized setting of nearest-neighbor Ising interactions, after which the effect of imperfections can be discussed. Starting with a product state in the Pauli-X basis, a chain of N qubits is time-evolved:

$$|\psi(t)\rangle e^{-itJ\Sigma^n Z^n Z^{n+1}} |-\rangle^{\otimes N}. \quad \text{Equation 2}$$

After a time $$t_{SPT} := \frac{\pi}{4|J|},$$

the resulting wave function forms the so-called 1D cluster state. Its defining characteristic is:

$$Z_{n-1} X_n Z_{n+1} |\psi(t_{SPT})\rangle = |\psi(t_{SPT})\rangle). \quad \text{Equation 3}$$

This implies that the entangled state has the remarkable property that measuring, for example, every even site in the X-basis leaves the remaining qubits in a Schrödinger cat state. Indeed, replacing $X_{2n} \to \pm 1$ by the measurement outcome, the post-measurement state satisfies $$Z_{2n-1} Z_{2n+1} |\psi_{out}\rangle = \pm |\psi_{out}\rangle$$

In addition, one can show that the state is symmetric, i.e., $\langle Z_{2n-1} \rangle = 0$. The only state satisfying these properties, is the (disordered) GHZ state, a Schrödinger cat state where neighboring spins on the odd sublattice are perfectly aligned or anti-aligned depending on the measurement outcome of the intervening site, as illustrated in FIG. 1A. Furthermore, since this information is available, one can always apply single-site spin flips to bring it to the ideal GHZ state:

$$|GHZ\rangle = \frac{|\uparrow \uparrow \ldots \uparrow\rangle + |\downarrow \downarrow \ldots \downarrow\rangle}{\sqrt{2}}, \quad \text{Equation 4}$$

although it is a Schrödinger cat state independent of this procedure.

To make this procedure practical, understanding is needed of its sensitivity to deviations from the above idealization, such as evolving with additional couplings or for the incorrect time. The ability to create a cat state via measurement is a stable property of the phase of matter that the cluster state belongs to. More precisely, it is known that in addition to the global Ising symmetry $\Pi_n X_n$, the cluster state is symmetric under spin-flips on even and odd sites, separately; deformations of the cluster state that preserve this symmetry define its so-called SPT phase.

As a first indication of the importance of this symmetry, it is explored what happens when the symmetry is slightly broken by time-evolving for the wrong duration. If t is not a multiple of $t_{SPT}$, the state does not enjoy the aforementioned sublattice symmetry. Indeed, a straightforward computation shows that (ignoring boundary effects and taking $|1-t/t_{SPT}| < 1/2$):

$$\langle \psi(t) | \prod_n X_{2n} | \psi(t) \rangle = \sin(2Jt)^N \sim e^{-N/\xi_s(t)}. \quad \text{Equation 5}$$

This defines a length scale $\xi_s(t)$ within which the state looks symmetric, with $\xi_s(t_{SPT}) = \infty$. In line with the idea that the symmetry is the determining factor, it is surmised that after measuring every other site, an imperfect cat state is obtained with correlation length Indeed, it is confirmed by a full solution of the model that the resulting state has long-range order for $\langle Z_{2m-1} Z_{2n-1} \rangle$ within a correlation length closely matching $\xi_s$, beyond which it decays to zero. This is plotted in FIG. 1B, where we see that $\delta$ grows rapidly as we approach $t \to t_{SPT}$. E.g., a 0.1% deviation results in long-range order over nearly half a million atoms; a 1% error still gives $\delta/(2a) \approx 4000$ (the original lattice having spacing a). Hence, even in the presence of timing imperfections, this procedure can produce large cat states in a finite amount of time.

A chain of Rydberg atoms gives a good approximation to Equation 9 with $$J = \frac{V(a)}{4},$$

with additional longer-range corrections. In case we use a single species of Rydberg atoms, the first correction occurs at distance r=2a with a van der Waals coupling V(2a)=V(a)/$2^6$, giving an additional evolution by $$e^{-\frac{1}{2^6}itJ\Sigma_n Z_n Z_{n+2}}.$$

However, one can show that since this Ising coupling preserves the spin-flip symmetry on even and odd sublattices, measuring the even sites still leads to a cat state with an infinite correlation length. It is thus only the third-nearest-neighbor correction which will lead to an imperfect cat state. Similar to Equation 5, we find that this leads to a correlation length $$\frac{\xi}{2a} = \frac{1}{2|\ln\cos(\pi/(2\times 3^6))|} \approx 2\times 10^5. \quad\text{Equation 6}$$

A near-perfect cat state is thus obtained.

In addition to knowing the size of the cat state that was prepare, it can be asked how close to the fixed-point GHZ limit it is. A useful fact is that, to a very high degree, the GHZ-fidelity of the final state can be equated with the cluster-state-fidelity of the pre-measurement state. To characterize the latter, the fact can be used that the expectation value of the stabilizer $Z_{n-1}X_nZ_{n+1}$ gives a lower bound on the fidelity. At first sight, this expectation value is affected by the second-nearest neighbor coupling at r=2a. However, in this 1D case, it can be shown that its effect is to simply tilt the Ising order parameter away from $Z_n$, which can be easily corrected by a single-site rotation at the end of the time-evolution. In conclusion, even for a single species the dominant correction is at r=3a, leading to a cluster stabilizer $$\langle Z_{n-1}X_nZ_{n+1}\rangle \approx \cos^2\left(\frac{\pi}{2\times 3^6}\right)\approx 0.999995. \quad\text{Equation 7}$$

This suggests a fidelity per site of $$\sqrt[N]{|\langle \text{cluster}|\psi(t_{SPT})\rangle|^2} \gtrsim \frac{1+\langle Z_{n-1}X_nZ_{n+1}\rangle}{n} \quad\text{Equation 8}$$

$$\approx 0.9999975 \quad\text{Equation 9}$$

This is such a high fidelity. One might worry that at this point other imperfections—which may usually reasonably be ignored —become dominant. One such imperfection is the fact that the initial product state is prepared by a pulse, which has a finite time on the order of tens of nanoseconds. A full tensor network simulation was performed of the proposed state preparation for the case of Rb $70S_{1/2}$, incorporating this imperfection. As we see in FIG. 1C, very high fidelities can be reached. The fact that the resulting fidelity is one order of magnitude worse than Equation 9 is due to the finite pulse time. Indeed, it was confirmed that artificially reducing the pulse time recovers Equation 9.

Toric and Color Code

Having established cat states in 1D, we now turn to 2D topological order.

Figure 2A:
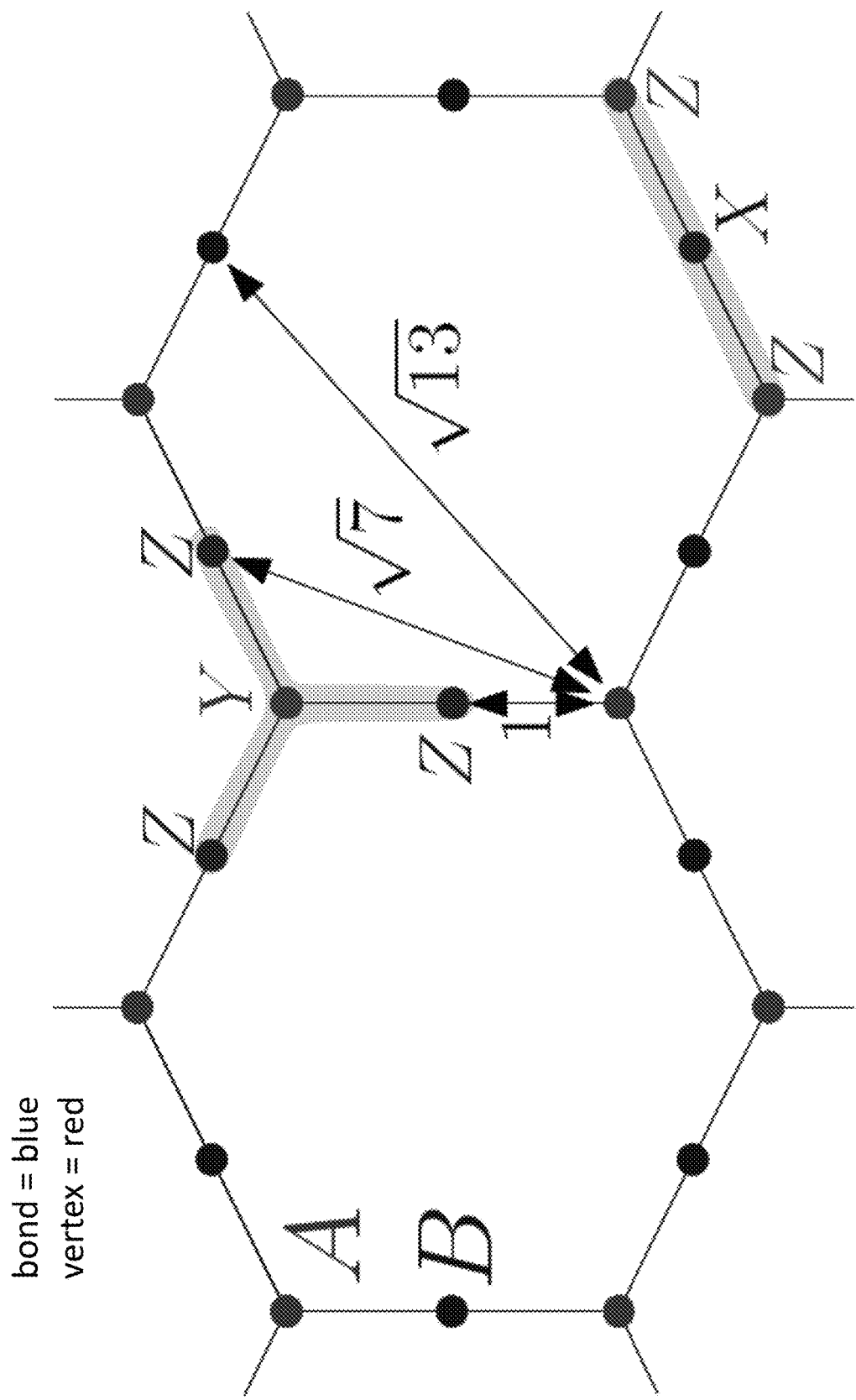
FIG. 2A and FIG. 2B, collectively illustrate a transition from toric and color code to non-Abelian topological order.
Figure 2B:
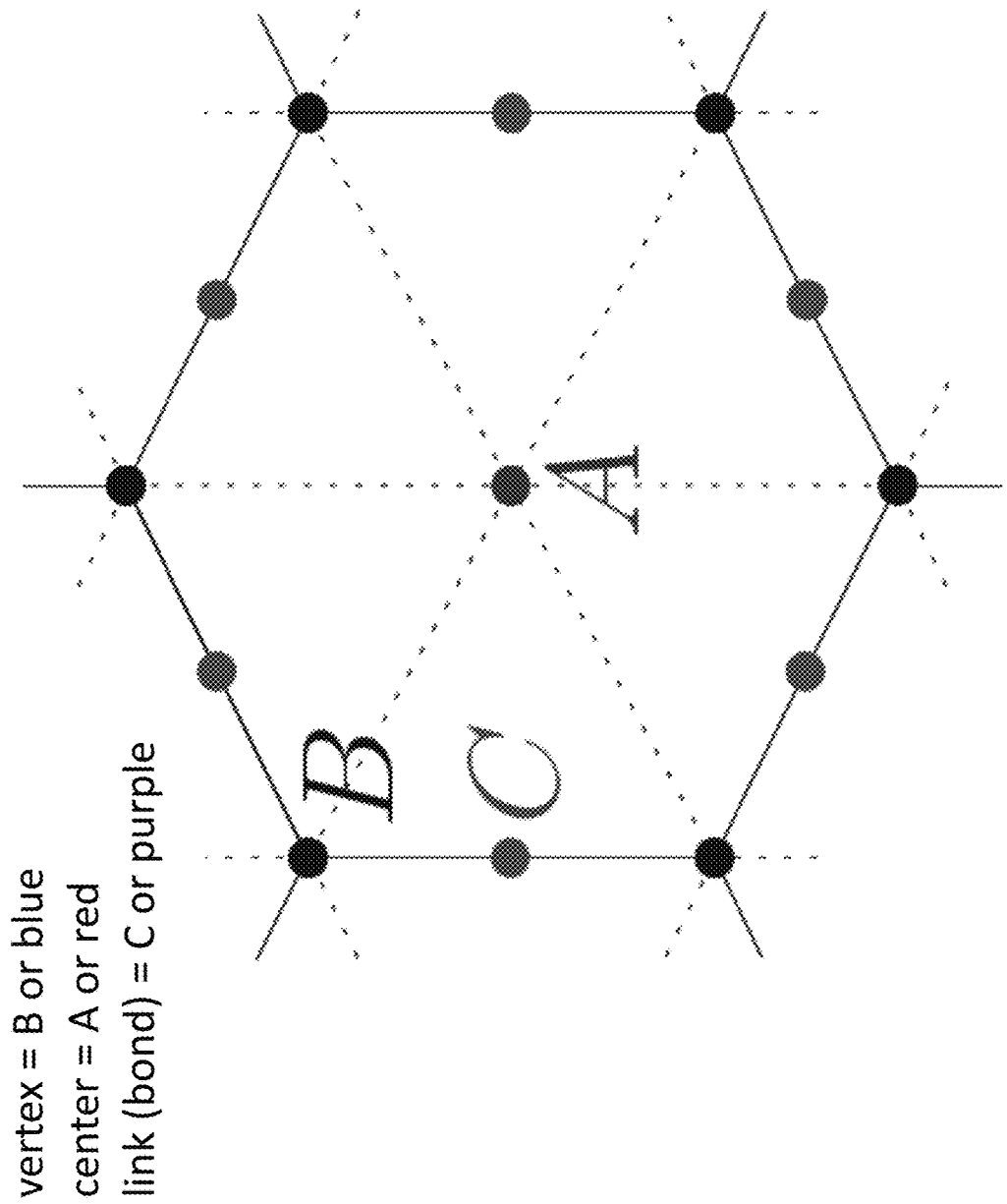

Referring now to FIG. 2A and FIG. 2B. Panel illustrates (a) placement of Rydberg atoms on the vertices (red) and bonds (blue) of the honeycomb lattice. Initializing into the product state $|-\rangle^{\otimes N}$ and time-evolving for $t=\pi/V(a)$, the cluster state is obtained whose two types of stabilizers are depicted. Measuring the Rydberg atoms on the red (vertex) sites in the Y-basis produces the toric code state on the blue (bond) sites up to known single-site spin flips. Corrections to topological order are given by longer-range van der Waals interactions connecting the red (vertex) and blue (bond) sublattices; the leading correction has a pre-factor $1/\sqrt{7}^6 \approx 0.003$. Panel (b) illustrates an example of putting atoms on the centers (red, A) and vertices (blue, B) of the hexagons. In this case, the time-evolution and measurement of the red (center, A) sites produces the color code. Subsequently loading atoms on the links (purple, C) can produce $D_4$ non-Abelian topological order after another round of time-evolution and measuring the blue sites.

Consider qubits on the vertices (A sublattice) and bonds (B sublattice) of the honeycomb lattice as shown in FIG. 2A. Like in the 1D case, start with a product state $|-\rangle^{\otimes N}$ and time-evolve evolve with a nearest-neighbor Ising interaction for a time $t_{SPT}$ to obtain a 2D cluster state which is invariant under the two types of stabilizers shown in FIG. 2A. In particular, for a given vertex v, we have $Y_v\mathcal{A}_v|\psi(t_{SPT})\rangle = |(t_{SPT})\rangle$ where $Y_v$ is the Pauli-Y on that vertex, and $\mathcal{A}_v = \Pi_{b\in v}Z_b$ is a product over the three neighboring bond qubits. Hence, upon measuring the A sublattice in the Y-basis, we obtain a state where $\mathcal{A}_v = \pm 1$ depending on the measurement outcome. Moreover, one can also show that for every hexagonal plaquette we have $\mathcal{B}_p = \Pi_{b\in p}X_b = 1$. These are exactly the two stabilizers of the toric code. The state has $\mathbb{Z}_2$ topological order for either $\mathcal{A}_v = \pm 1$. If one wishes to use this state for quantum computation purposes, one can simply store these measurement outcomes and use them in post-processing. Alternatively, one can always bring the state to $\mathcal{A}_v = \pm 1$ by applying string operators formed by single-site X-rotations.

If implement using Rydberg atoms, the time-evolution gets contributions from the longer-range van der Waals interactions. However, like in 1D, the ability to produce topological order via measurement is a robust property of the entire SPT phase of this 2D state. The practical consequence is that the topological phase is stable to all longer-range Ising couplings which do not couple the A and B sublattice. The dominant correction is thus at a distance $r=\sqrt{7}a$, shown in FIG. 2A and FIG. 2B. This means that the post-measurement state exhibits topological order only over a finite number of atoms on the B sublattice, which we compute (similar to Equation 5 and Equation 6) to be $$\frac{3}{2}\times\frac{1}{6}\times\frac{1}{|\ln\cos(\pi/(2\times\sqrt{7}^6))|}\approx 2\times 10^4. \quad\text{Equation 10}$$

Here 3/2 counts the number of B sites per A site, and 6 represents the number of couplings at distance $r=\sqrt{7}a$. To exemplify the importance of choosing an optimal lattice: for the square and triangular lattices we find $\mathbb{Z}_2$ topological order for roughly 3000 and 300 atoms, respectively.

In addition to achieving the topological phase in a macroscopic system, a more refined question is how close the described protocol is to the toric code fixed-point limit. Unlike the above discussion, this depends on the strength of the AA and BB couplings. For concreteness, consider dual-species arrays, where these intra-species couplings can be made negligible (alternatively, they can be suppressed using local addressing). The expectation value of the stabilizers is then (see also FIGS. 2A, B):

$$|\langle \mathcal{A}_v \rangle| \approx \cos^6\left(\frac{\pi}{2\sqrt{7}^6}\right)\cos^6\left(\frac{\pi}{2\sqrt{13}^6}\right)\ldots \approx 0.99993$$

$$\langle \mathcal{B}_p \rangle \approx \cos^{12}\left(\frac{\pi}{2\sqrt{7}^6}\right)\cos^{12}\left(\frac{\pi}{2\sqrt{13}^6}\right)\ldots \approx 0.99987.$$

This implies a toric code fidelity $\sqrt[N]{\mathcal{F}} \gtrsim 0.9999$, making the state useful for quantum information purposes. Indeed, it is well-known that terminating the lattice with an alternation of rough and smooth boundaries gives a surface code. Applying local X- and Z-pulses in string patterns creates and moves e- and m-anyons, acting as logical operators on the topological qubit. Active error correction requires repeatedly measuring the $\mathcal{A}_v$ stabilizers, which is achieved by reloading the A sublattice and repeating the preparation procedure. Similarly, the $\mathcal{B}_p$ stabilizers can be measured by performing a X→Z rotation and loading atoms at the center of the plaquettes (for which a square lattice is most natural).

This procedure can be generalized to other topological orders. For instance, if the A sublattice lives at the centers of plaquettes of the honeycomb lattice, and B are the vertices (see FIG. 2B), then repeating the above procedure produces the color code on the B sublattice, whose stabilizers are $\Pi_{v \in p} X_v$ and $\Pi_{v \in p} Z_v$ for every plaquette. For this state—which has significantly more quantum computing power than the toric code—a fidelity per site is $\sqrt[N]{\mathcal{F}} \gtrsim 0.997$. The 3D toric code can also be prepared —which exhibits more thermal stability—with $\sqrt[N]{\mathcal{F}} \gtrsim 0.9998$ on the diamond lattice.

Fracton Order

Figure 3A:
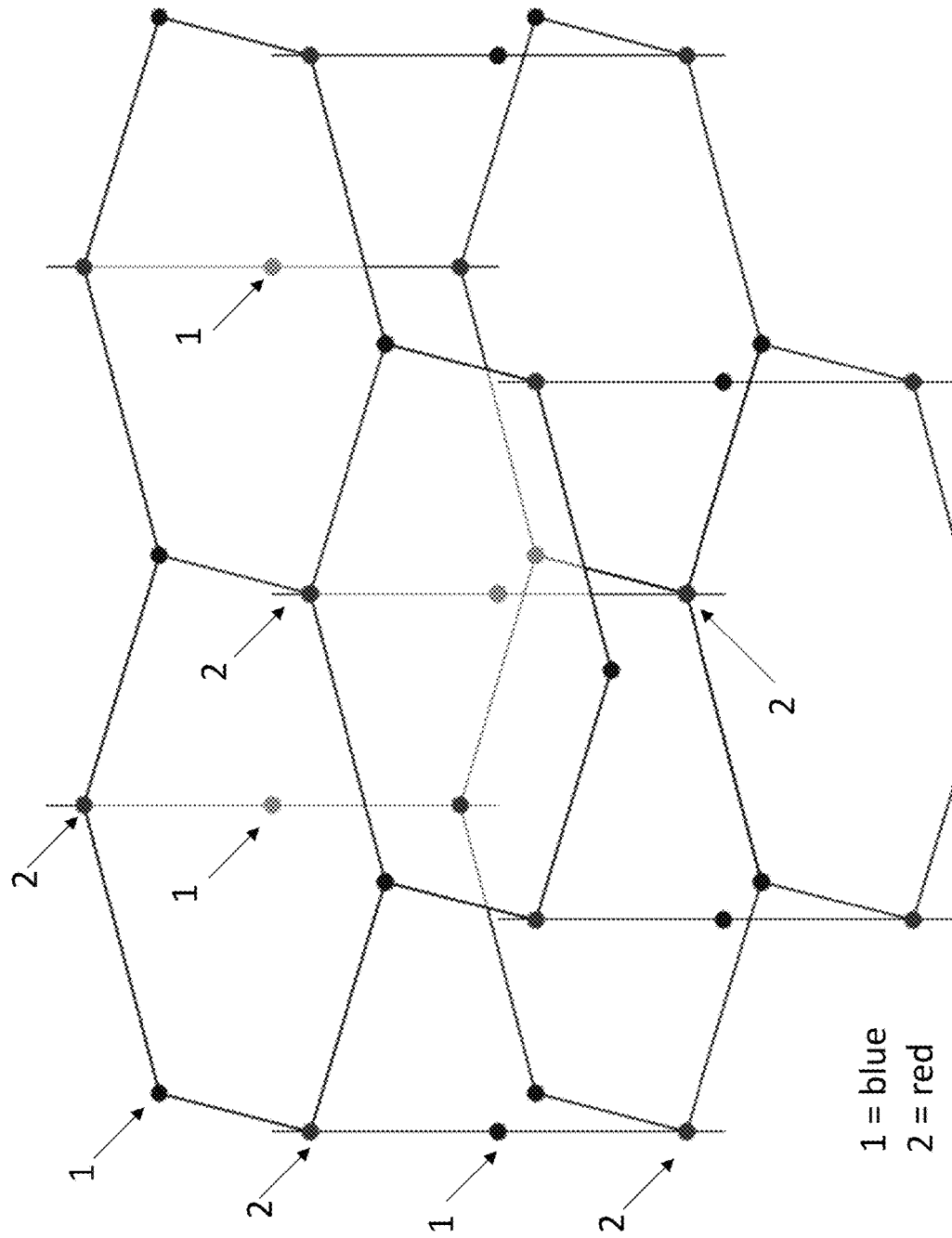
FIG. 3A and FIG. 3B, collectively, illustrate FIG. 3 a protocol for realizing a fractal spin liquid with fracton order.
Figure 3B:
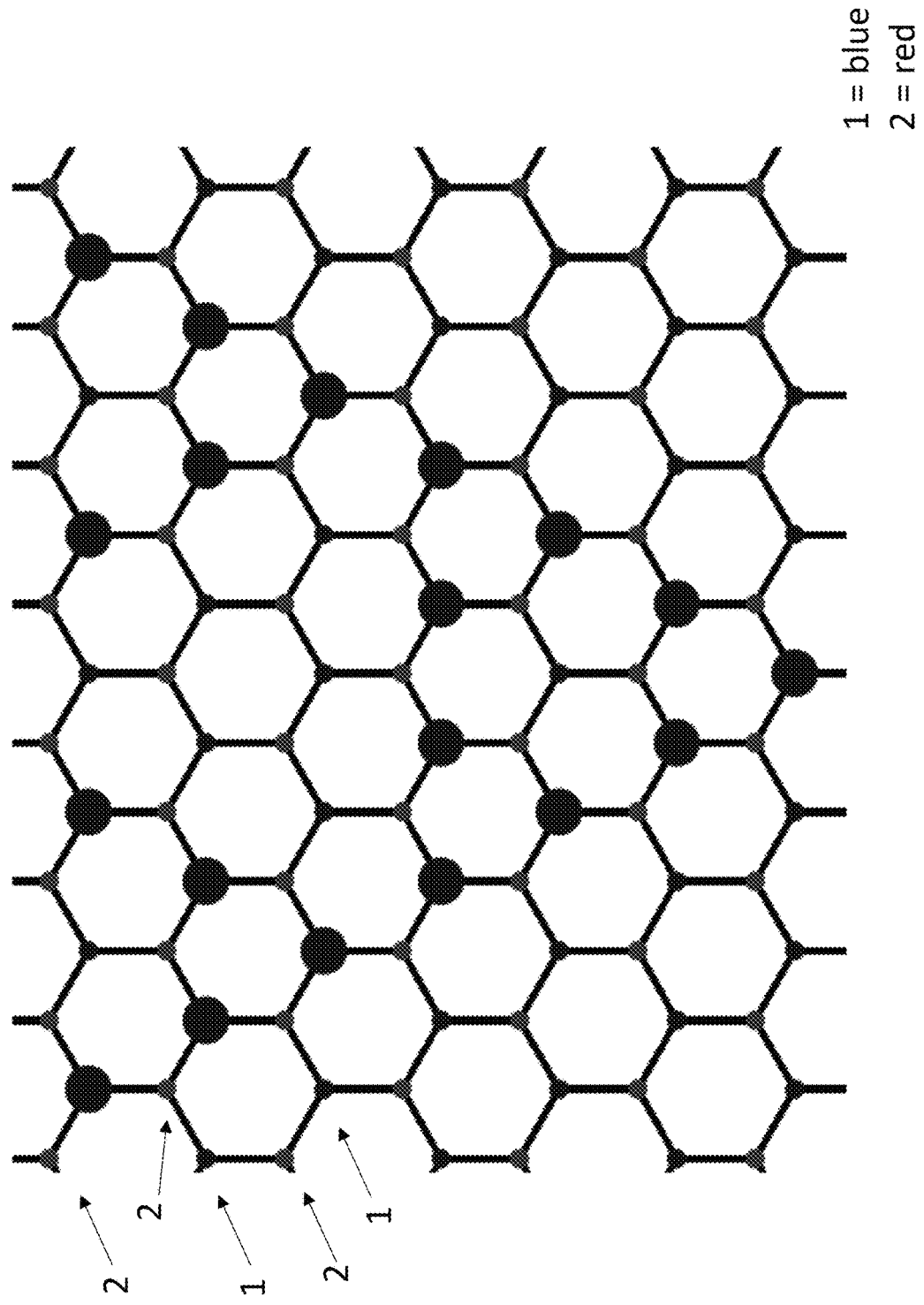

Referring now to FIG. 3A and FIG. 3B. Panel (a) depicts Rydberg atoms placed at the red ("2") and blue ("1") sites on the hexagonal prism lattice. After time-evolving under the Rydberg interaction and measuring the red sites, the ground state of the so-called Sierpinski prism model is obtained. Panel (b) depicts quasiparticles that have restricted mobility in the hexagonal layers due to being created at the corners of fractal (Sierpinski) operators.

To achieve fracton order—a very exotic version of topological order since it cannot be described by a conventional quantum field theory—we consider qubits on the 3D hexagonal prism lattice shown in FIG. 3A, with the red and blue dots defining the A and B sublattices, respectively. As above, time-evolving a product state under a nearest-neighbor Ising interaction prepares the cluster state on this lattice. Upon measuring the red sublattice, we obtain a state which can be equated with the fractal spin liquid introduced by Yoshida. This exhibits fracton order. In particular, while particles can move in the z-direction by the application of a string operator (as in the toric code), in the hexagonal planes they live at the endpoints of a fractal operator (in particular, the Sierpinski triangle; see FIG. 3B), restricting their mobility.

Unlike the previously discussed cases of the GHZ state or topological order, cluster SPT phases giving rise to fracton order are not protected by a global symmetry on the A sublattice, but instead by a subsystem or fractal one. A practical consequence is that AA van der Waals couplings will affect the stability of the fractal spin liquid. First consider the dual species case where these contributions can be neglected. We see in FIGS. 3A and 3B that the first correction, coupling A to B, occurs at r=2a. From this, the fracton phase is found to persists over approximately 400 atoms. However, by interspersing the time-evolution with four sublattice pulses, this number increases to 1300, which can be systematically improved upon using local addressing. The corresponding expectation value of the stabilizers is 0.997, giving a fidelity $\sqrt[N]{\mathcal{F}} \gtrsim 0.998$. This establishes a high-fidelity implementation of a fracton state. Moreover, the aforementioned procedure has the added benefit of cancelling nearest-neighbor AA couplings, meaning this could also be successfully realized in single-species arrays if one can measure the A sublattice.

Hereinbelow, we discuss a different lattice where measurements lead to an approximate realization of the paradigmatic X-cube model which can be realized with stabilizer expectation values 0.94 in the absence of local addressing.

Non-Abelian Defects and Anyons

Figure 4A:
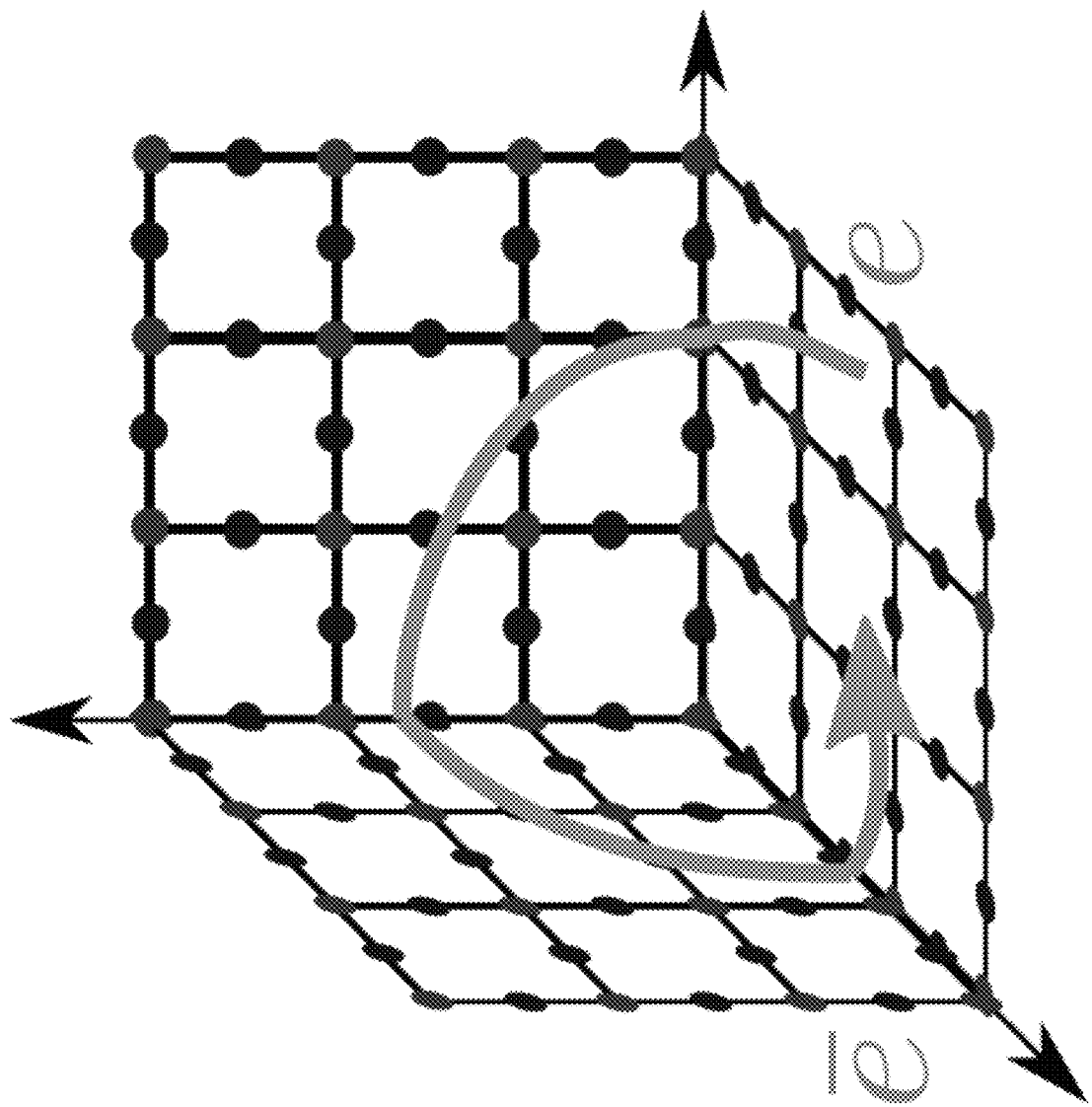
FIG. 4A and FIG. 4B, collectively, illustrate $Z_3$ and $S_3$ non-Abelian topological order.
Figure 4B:
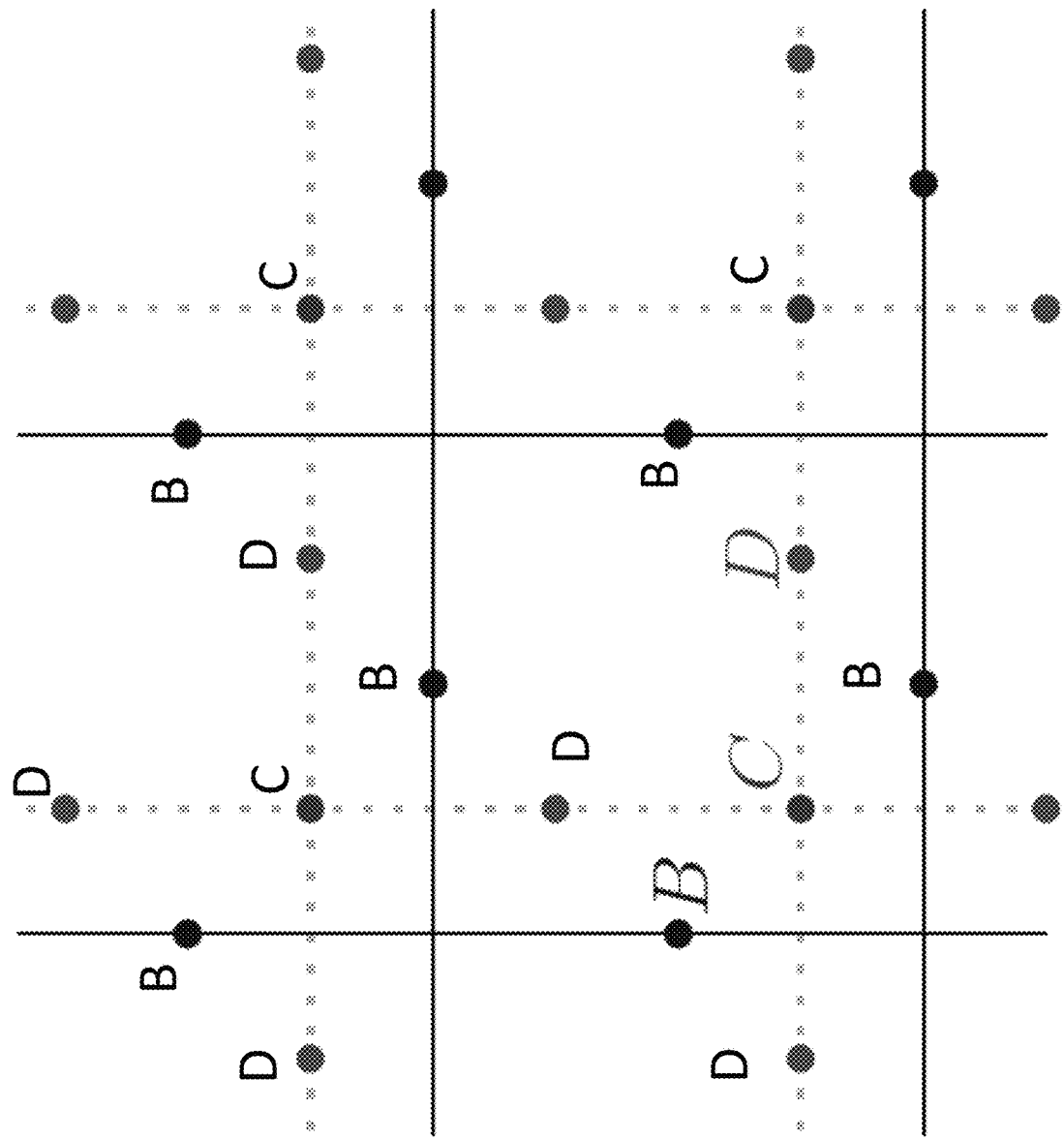

Referring now to FIG. 4A and FIG. 4B. Panel (a) depicts time-evolving qutrits (formed by pairs of Rydberg-blockaded atoms) on the vertices and bonds of this 3D configuration and measuring the A sublattice creates the $\mathbb{Z}_3$ toric code with a non-Abelian defect in the corner. This effectively realizes a square lattice with a disclination; an e-anyon traveling around it transforms into its conjugate $\bar{e}$. Panel (b) illustrates that, starting with the $\mathbb{Z}_3$ toric code on the B sublattice, Rydberg atoms are loaded on the C and D sublattices. An appropriate sequence of time-evolution and pulses, followed by measuring the C sublattice, produces non-Abelian $S_3$ topological order.

The long-range entangled states we have obtained thus far are all Abelian, i.e., braiding their excitations can at most lead to phase factors. In this last section, it is shown how non-Abelian topological order can arise by using multiple time-evolution and measurement steps.

The first type of non-Abelian topological order discuss herein is associated to the group $D_4$ (i.e., the symmetry group of the square). This can be obtained by combining the toric and color code constructions discussed above. Consider the honeycomb lattice in FIG. 2B, with the A sublattice (red) at the center of plaquettes, the B sublattice (blue) at the vertices, and the C sublattice (purple) on the bonds. A strikingly simple representation of a state on the C sublattice with non-Abelian $D_4$ topological order is found through the following sequence of controlled-Z and single-site rotations:

$$\langle +|_{AB} \prod_{\langle b,c \rangle} CZ_{b,c} \prod_{b \in B} e^{-i\frac{\pi}{8}Y_b} \prod_{\langle a,b \rangle} CZ_{a,b} |+\rangle_{ABC}, \qquad \text{Equation 11}$$

where $\langle b, c \rangle$ denotes nearest neighbors connecting the B and C sublattices. While Equation 11 is written in terms of post-selection for simplicity, this is not required since measurement outcomes can be corrected. To create this state in Rydberg atom arrays, load the A and B sublattice into a product state, with controlled-Z being naturally generated by time-evolution. As discussed above, measuring the A sublattice produces the color code, whose measurement-induced Abelian anyons can be removed with single-site rotations. Now apply the Y-rotation in Equation 11 and load the C sublattice such that time-evolution induces the second controlled-Z. Finally, measuring the B sublattice can again produce Abelian anyons, removable by single-site X-rotations.

Interestingly, if one had measured the A sublattice at the end (or if one had not removed the anyons in the intermediate color code), a density of non-Abelian anyons could have been produced in the resulting $D_4$ topological order, which are much more difficult to efficiently remove. In this regard, the multi-step process is important, even when implementing Equation 11 in a quantum computer rather than through time-evolution in a Rydberg atom array.

The intermediate state will now be the $\mathbb{Z}_3$ toric code, rather than the color code. For this, qutrits instead of qubits are used. One straightforward option is to consider pairs of qubits where one uses only three states, which we label $|0\rangle$, $|1\rangle$, $|2\rangle$ (i.e., never initializing or evolving into the fourth state). In the context of Rydberg atoms, this is naturally achieved by having two atoms in close proximity such that the Rydberg blockade forbids them from being simultaneously excited (although using multiple energy levels in a single atom offers an alternative route to qutrit encoding). Similar to the qubit case, time-evolution can generate the controlled-Z gate for qutrits, defined as $$CZ|i\rangle \otimes |j\rangle = \omega^{ij}|i\rangle \otimes |j\rangle \text{ with } \omega = e^{\frac{2\pi i}{3}}.$$

Hence, placing our qutrits on the lattice in FIG. 2A can generate the $\mathbb{Z}_3$ toric code on the honeycomb lattice. However, it will be convenient to instead consider the Lieb lattice (i.e., vertices (A) and bonds (B) of the square lattice), thereby producing this topological state on the B sublattice.

As an aside, although this topological order is Abelian, it can be used to trap non-Abelian defects. For instance, consider the 3D configuration in FIG. 4A, which can be interpreted as a 2D Lieb lattice with a disclination. Repeating the above preparation protocol produces the $\mathbb{Z}_3$ toric code with such a disclination defect. If an e- or m-anyon moves around the corner in FIG. 4A, it will transform into the conjugate anyon ($\bar{e}$ or $\bar{m}$), leading to a quantum dimension d=3 for the defect.

Finally, to transform this state into $S_3$ topological order, consider the C and D sublattices defined in FIG. 4B, which are loaded with effective qubits. Through time-evolution and sublattice rotations, a controlled-charge-conjugation can first be implemented for the nearest neighbors connecting the B and C sublattices. Subsequently, controlled-Z can be implemented for the nearest neighbors connecting the C and D sublattices. Remarkably, measuring the C qubits produces the ground state of the $S_3$ quantum double model on the remaining qutrits on B and qubits on.

At a conceptual level, this construction can be interpreted as effectively gauging the $\mathbb{Z}_2$ charge-conjugation symmetry of the $\mathbb{Z}_3$ toric code, in line with $S_3 = \mathbb{Z}_3 \rtimes \mathbb{Z}_2$.

Outlook

In summary, a variety of highly sought after long-range entangled states can be efficiently created from simple ingredients: initialization of qubits, unitary time-evolution under Ising interactions, and measurement of a subset of qubits, which can be realized on existing experimental platforms. An implementation in Rydberg atom arrays was described, by identifying lattice structures that leverage their intrinsic interactions and demonstrate high fidelity preparation of 1D GHZ and 2D tonic and color code states, as well as 3D fracton phases. Several possible generalizations of the disclosed protocol have been discussed. For instance, using the Rydberg blockade one can realize long-range entangled qutrits; using 3D configurations one can obtain 2D lattices with exotic defects; and by appealing to multiple measurement steps, one can even realize states hosting non-Abelian anyons.

Given that the protocol described herein, it is a worthwhile endeavour to further explore how the resulting states could be used. The 1D GHZ state is well-known to be useful in quantum metrology due to its nonclassical sensitivity to external fields. Creation of surface codes for the toric and color codes has been described herein, even allowing for active error correction. Similarly, the 3D fracton states described herein could be similarly used to perform quantum computation, although its surface code properties have not yet been extensively explored.

A particularly exciting prospect is the realization of non-Abelian topological order in engineered quantum systems. Here it is demonstrated how both $S_3$ and $D_4$ topological order can be realized in Rydberg atom arrays. The novel schemes proposed herein could be used to realize $D_4$ topological order in a chip of superconducting qubits using the simple geometry of FIG. 2B. Note that Equation 11 requires a circuit which is only ten layers deep, which is achievable with current coherence times.

Methods

Written out in spin notation, the Hamiltonian of interest is:

$$H = \sum_i \frac{\Omega_i}{2} X_i - \sum_i \frac{h_i}{2} Z_i + \frac{1}{8} \sum_{i \neq j} V_{ij} Z_i Z_j \qquad \text{Equation 12}$$

with $$h_i = \delta_i + \frac{1}{2} \sum_{j \neq i} V_{ij}$$

(compared to Equation 1). The extra shift of the longitudinal field—explicitly giving an Ising interaction—is also practically significant, since it is important for the stability of the resulting state.

Dual Species and Förster Reasonances

One interesting option is to use different Alkali atoms for the two sublattices of the set-ups described herein. In addition to making it possible to measure a single sublattice, it can be used to suppress the intra-species interaction. In particular, it is known that by using (near-) Förster resonances, one can choose the Rydberg levels of each atom such that the intra-species interaction is negligible. For instance, the inter-species interaction between the $48S_{1/2}$ state in Rubidium and the $51S_{1/2}$ state in Cesium is roughly 100 times larger than the intra-species coupling, which could potentially be further optimized by exploring higher Rydberg states or other atoms.

The tunability of the dual species interaction derives from finding Rydberg states such that there are nearly-degenerate states (e.g., for a given choice of S-states in Rubidium and Cesium, the energy might be approximately unchanged if the Rubidium (Cesium) atom in an S-state transitions to a lower (higher) energy P-state). It is desirable to place the atoms far apart enough such that this transition is considerably off-resonant; beyond the so-called 'crossover distance' $R_c$, the interaction is effectively van der Waals (for distances shorter than $R_c$, the interaction decays as $\sim 1/r^3$ and additional spin-flop terms would appear in the Hamiltonian, which should be avoided). For instance, for the aforementioned example of the Rb $48S_{1/2}$ and Cs $51S_{1/2}$ states, $R_c \approx 7.5$ μm. For a spacing a=10 μm, the inter-species interaction is still at the MHz scale (with the intra-species coupling being negligible). The proposed preparation time is $$\frac{\pi}{V(a)}$$

which is thus on me order of microseconds—fast enough to neglect decoherence effects which arise at ~100 µs. The preparation time can be reduced by considering higher principal quantum numbers.

Lower Bound on Stabilizer Fidelity Pre-Measurement

It has been shown that the quantum state $|\psi\rangle$ on N qubits has a fidelity $\mathcal{F} \geq 1-N\varepsilon/2$ for a stabilizer state corresponding to stabilizer operators K if $\langle\psi|K|\psi\rangle = 1-\varepsilon$. If $N\varepsilon \ll 1$, this implies that the fidelity density satisfies the lower bound $\sqrt[N]{\mathcal{F}} \geq 1-\varepsilon/2$. Since the fidelity density will converge a finite value as $N \to \infty$ (at least for a state with a finite correlation length), it is expected that the condition $N\varepsilon \ll 1$ does not need to be explicitly enforced (although this is of course the region where the bound is the most useful). Indeed, in one spatial dimension one can straightforwardly prove using matrix product state techniques that the bound $\sqrt[N]{\mathcal{F}} \geq \varepsilon/2$ is always satisfied for $\langle\psi|K|\psi\rangle = 1-\varepsilon$, even in the thermodynamic limit.

Lower Bound on Stabilizer Fidelity Post-Measurement

The above gives a lower bound on the fidelity for the cluster state, based on the expectation value of the stabilizer. Of ultimate interest is the fidelity with respect to the long-range entangled state for the post-measurement state. Fortunately, these two can be equated for the following reason. Firstly, one can show that $\langle X_n \rangle = 0$, making both measurement outcomes equally likely. Secondly, the correlations between X-measurements on different sites is completely negligible (e.g., in the 1D case we find that $\langle X_n X_{n+2} \rangle < 10^{-10}$ even upon including all longer-range couplings in the single-species set-up). Hence, to a very good degree, the post-measurement state is given by:

$$|\psi_{out}\rangle = \prod_{a \in A}\left(\frac{X_a + s_a}{\sqrt{2}}\right)|\psi\rangle, \quad \text{Equation 13}$$

where $s_a = \pm 1$ denotes the measurement outcome. From the above explicit formula, it is straightforward to confirm our claim about the equality of fidelities.

Numerical Simulation of Cluster State Preparation

Consider $^{87}$Rb in the Rydberg level $70S_{1/2}$. The intrinsic van der Waals interaction is $H_{int} = U\Sigma_{i<j} n_i n_j/|r_i-r_j|^6$ with $U \approx 5$ THz µm$^6$. If a is the lattice spacing, then the nearest-neighbor interaction is $V(a) = U/a^6$. For $a = 10$ µm ($a = 12$ µm) we have $V(a) \approx 5$ MHz ($V(a) \approx 1.7$ MHz). All atoms are initialized in their ground state. An X-pulse is applied for a time $t = t_{pulse}$ with strength $$\Omega = \frac{\pi}{2t_{pulse}}.$$

Taking $t_{pulse} = 20$ ns, corresponding to $\Omega \approx 78$ MHz, a Z-pulse is then applied for the same time with $$h = -\frac{\pi}{2t_{pulse}}.$$

(Note that one can avoid the need for this separate pulse: since Z commutes with the Rydberg interaction, one can perform both at the same time.) After these pulses, the state $|-\rangle^{\otimes N}$ is realized (up to corrections due to the interactions which are present during the short pulse; the simulations include these interactions). Next, time-evolution is performed under the natural Ising interaction ($\Omega = h = 0$) for a time $$t_{SPT} = \frac{\pi}{V(a)} - \frac{5}{2} t_{pulse}.$$

After this time-evolution, a final X-pulse is applied of strength $$\Omega = -\frac{\pi}{2t_{pulse}} \times \frac{1}{2^6}.$$

The simulations are performed using the density matrix renormalization group method for infinite systems, thereby directly working in the thermodynamic limit. It was found that small bond dimensions, $\chi = 20-40$, were already sufficient to guarantee convergence. (Note: if we the pulse time can be reduced to e.g., $t_{pulse} = 5$ ns, then the fidelity goes up another order of magnitude: we find 0.999997 (for $a = 12$ µm), in close agreement with the prediction in Equation 9).

Dual Stabilizer

When measuring $X_b$ on a given site of the B sublattice, then any stabilizer that does not commute with it is no longer a stabilizer of the post-measurement state. However, sometimes a product of such stabilizers commutes with all X-measurements, thereby providing a constraint on the post-measurement state. E.g., in the 1D case, the product of $X_{2n} Z_{2n+1} X_{2n+2}$ (each individual factor not commuting with the X-measurements) gives the constraint that the resulting post-measurement state has the $\mathbb{Z}_2$ symmetry $\Pi_n Z_{2n+1}$. In the 2D toric code, a local constraint is obtained instead: the product of the cluster term on four bonds around a plaquette gives the condition $\mathcal{B}_p = +1$.

The Effect of Symmetry Preserving Couplings

For the case of the GHZ and toric code states, it is shown that AA and BB Ising couplings do not affect the resulting phase of matter. The argument for BB is simple to see: these gates commute with the measurement and hence dress the post-measurement stat with a finite-depth circuit (which cannot destroy the long-range entangled states). The AA couplings are more interesting and subtle: in fact, they also push through to just being effective finite-depth circuits on the post-measurement states, which one can argue by using the stabilizer property of the cluster state, which allows one to replace it by X (or a product thereof) on the B sublattice. This is derived in explicit detail for the 1D case in the Supplemental Material. In conclusion, only the longer-range AB couplings affect the quality of the resulting phase of matter.

Improvements Using Local Addressing

The protocol described herein can be further improved using spatially-dependent fields, called local addressing. This tool has already been used in large Rydberg arrays.

To illustrate how this can suppress or even cancel unwanted van der Waals interactions, consider again the 1D case. Using spatially-dependent X-pulses, qubits can be flipped on a sublattice of arbitrary choice. Let $\chi_k$ correspond to flipping every fourth site starting from $k = 1, 2, 3, 4$. If $U(t)$ denotes the time-evolution, then consider the following alternation of time-evolution and sublattice pulses sketched in FIG. 1D:

$$\chi_2 \chi_3 U(t_{SPT}/2) \chi_1 \chi_3 U(t_{SPT}/2) \chi_1 \chi_2 U$$
$$(t_{SPT}). \quad \text{Equation 14}$$

The additional procedure does not affect the net time-evolution for any sites separated by an odd multiple of lattice spacings; in particular, the nearest-neighbor evolution still prepares the cluster state. However, the second-nearest neighbor coupling drops out completely, making r=3a the dominant correction. (The fourth-nearest neighbor experiences an effective doubled time-evolution.) Similarly, local addressing can suppress unwanted contributions for the fracton model.

This cancellation procedure can also be useful after the state preparation. Indeed, the remaining B sublattice will continue to time-evolve under the long-range Ising interaction. By construction, this coupling is small, especially in the dual-species set-up. Nevertheless, such effects can accumulate. One can then apply local pulses as above to effectively change the sign of a problematic coupling, such that further time-evolution will undo its effects. In the 1D case this is not necessary, since the GHZ state is an eigenstate of the van der Waals interactions.

Fracton Order

Figure 5A:
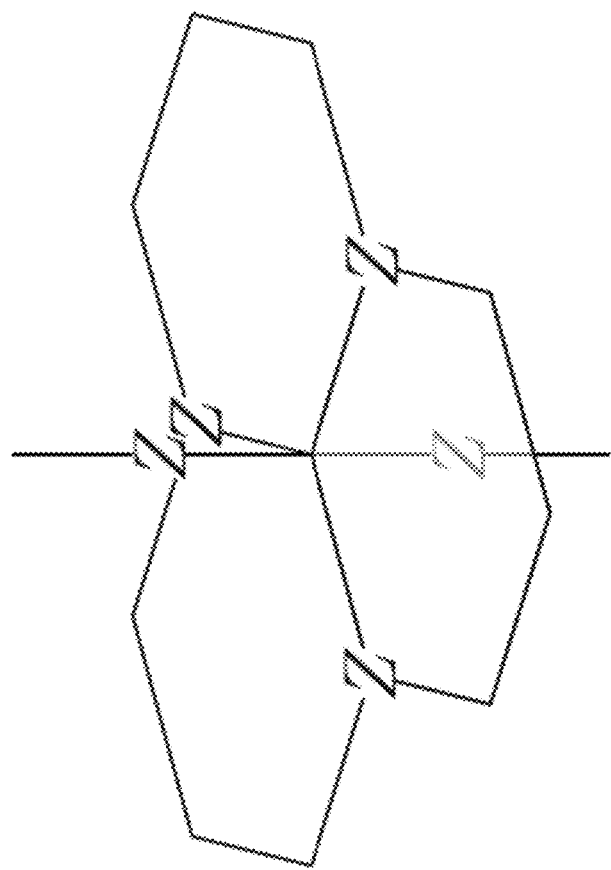
FIG. 5A and FIG. 5B each depicts a stabilizer useful in implementing a fraction order.
Figure 5B:
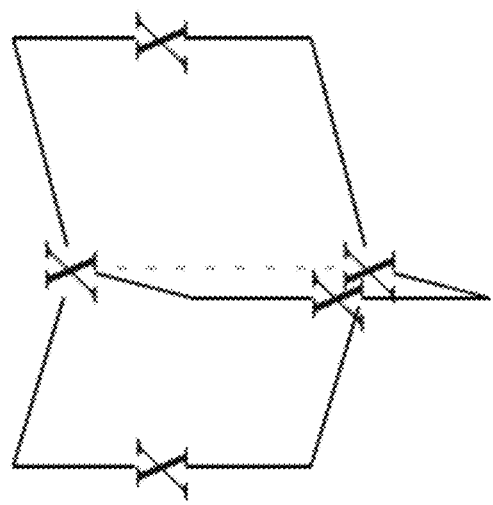

Upon measuring the red sublattice of the cluster state on the 3D lattice in FIG. 3A, we obtain the stabilizers shown in FIG. 5A and FIG. 5B.

These can be equated with the stabilizers of the fractal spin liquid introduced in B. Yoshida, Exotic topological order in fractal spin liquids, Phys. Rev. B 88, 125122 (2013).

The following expectation value can be obtained for the stabilizers in the dual-species set-up:

$$\langle \mathcal{A}_v \rangle \approx \cos^{15}\left(\frac{\pi}{2 \cdot 2^6}\right) \cos^6\left(\frac{\pi}{2 \cdot \sqrt{5}^6}\right) \ldots \approx 0.995 \quad \text{Equation 15}$$

$$\langle \mathcal{B}_p \rangle \approx \cos^{42}\left(\frac{\pi}{2 \cdot 2^6}\right) \cos^{12}\left(\frac{\pi}{2 \cdot \sqrt{5}^6}\right) \ldots \approx 0.986 \quad \text{Equation 16}$$

This result can be improved by using local addressing: the out-of-plane contributions at r=2a can be cancelled by noticing that the red sublattice is tripartite (forming a triangular lattice in each layer). Correspondingly, split A up into $A_1 \cup A_2 \cup A_3$, and let $\mathcal{X}_{A_i}$ denote flipping qubits on the $A_i$ sublattice via an X-pulse. Consider $$\mathcal{X}_{A_3} U(t) \mathcal{X}_{A_3} \mathcal{X}_{A_2} U(t) \mathcal{X}_{A_2} \mathcal{X}_{A_1} U(t) \mathcal{X}_{A_1} U(t) \quad \text{Equation 17}$$

Setting $t=t_{SPT}/2$ will create the cluster state, and effectively remove the aforementioned couplings. The following improved results have been obtained:

$$\langle \mathcal{A}_v \rangle \approx \cos^3\left(\frac{\pi}{2 \cdot 2^6}\right) \cos^6\left(\frac{\pi}{2 \cdot \sqrt{5}^6}\right) \ldots \approx 0.9985 \quad \text{Equation 18}$$

$$\langle \mathcal{B}_p \rangle \approx \cos^6\left(\frac{\pi}{2 \cdot 2^6}\right) \cos^{12}\left(\frac{\pi}{2 \cdot \sqrt{5}^6}\right) \ldots \approx 0.997 \quad \text{Equation 19}$$

$D_4$ Topological Order

To prove that Equation 11 exhibits $D_4$ non-Abelian topological order, first consider $$\langle + | A \prod_{\langle a,b \rangle} CZ_{a,b} | + \rangle_{A,B}. \quad \text{Equation 20}$$

As discussed above, this is the color code on the B sublattice. Next, use the fact that gauging the $\mathbb{Z}_2$ Hadamard symmetry of the color code produces $D_4$ topological order. Usually, gauging is a nonlocal transformation which would require a linear-depth circuit. However, it is known that an arbitrary initial state can be gauged by a finite-depth circuit (made of controlled-Z gates) and single-site projections or measurements, and this general fact can be used to produce $D_4$ topological order. In particular, first perform a Y basis rotation to transform the Hadamard symmetry into $\Pi_{b \in B} X_b$ after which entangle the B degrees of freedom with a product state on the C sublattice through controlled-Z:

$$\prod_{(b,c)} CZ_{b,c} \prod_{b \in B} e^{-i\frac{\pi}{8} Y_b} \langle + | A \prod_{\langle a,b \rangle} CZ_{a,b} | + \rangle_{A,B}. \quad \text{Equation 21}$$

Now projecting the B sites into $\langle +1 |$ will effectively implement the gauging of the original color code, thereby producing $D_4$ topological order.

$\mathbb{Z}_3$ Toric Code, its Defects, and $S_3$ Topological Order

To create the $\mathbb{Z}_3$ toric code, place the qutrits on the vertices and bonds of the square lattice, forming the A and B sublattices respectively. One can show that combining the natural Rydberg interaction with several sublattice pulses gives the following effective nearest-neighbor interaction:

$$H_{a,b} = U(n_{1,a} n_{1,b} + n_{2,a} n_{2,b} - n_{1,a} n_{2,b} - n_{2,a} n_{1,b}), \quad \text{Equation 22}$$

where $n_{i,\lambda}$ denotes whether atom i on site $\lambda$ is excited. Hence, the time-evolution $$e^{-\frac{4\pi i}{3U} H_{a,b}}$$

implements the controlled-Z gate defined in the main text, producing the topological state. Note that the first correction connecting different sublattices has a prefactor $$\left(\frac{r_{AB}}{r_{AB'}}\right)^6 = \frac{1}{\sqrt{5}^6} \approx 0.008,$$

justifying a nearest-neighbor approximation.

If the lattice being used has a disclination, it can trap a non-Abelian defect. Indeed, the usual $\mathbb{Z}_3$ cluster state is prepared by having a pattern of CZ and $(CZ)^\dagger$ being unitarily equivalent to using only CZ if we act with charge-conjugation on, for example, every other A site along with the B sites immediately above and to the right. However, a disclination destroys the bipartiteness of A, leading to a charge-conjugation defect. This kind of defect has a quantum dimension d=3.

Described in the sections below are the details of how this $\mathbb{Z}_3$ toric code can be transformed into non-Abelian topological order. The key steps are summarized below. First, starting with the $\mathbb{Z}_3$ toric code on the B sublattice in FIG. 4B, load the C sublattice with Rydberg atoms serving as qubits. Their natural interaction is:

$$H_{BC} = U_{BC} \sum_{\langle b,c \rangle} (n_{1,b} n_c + n_{2,b} n_c). \quad \text{Equation 23}$$

Combining time-evolution for a time $$t = \frac{\pi}{U_{BC}}$$

with an appropriate pulse effectively implements controlled-charge-conjugation for nearest-neighbors. Then load the D sublattice with qubits, and let C and D interact under $$H_{CD} = U_{CD} \sum_{(c,d)} n_c n_d \qquad \text{Equation 24}$$

for time $$t = \frac{\pi}{U_{CD}},$$

combined with a pulse that cancels out coupling to B sublattice, implementing a controlled-Z. Finally, measuring the C qubits produces the ground state of the $S_3$ quantum double model on the remaining qutrits on B and qubits on D.

Supplemental Materials

Preparation of Cat State with Timing Imperfections

Consider the state $|\psi(t)\rangle = e^{-iHt}|-\rangle^{\otimes N}$ obtained by evolving the product state with the Ising Hamiltonian $H = J\Sigma Z_n Z_{n+1}$. (For the special time $$t_{SPT} = \frac{\pi}{4|J|},$$

this coincides with the cluster state.)

Theorem. Suppose one measures the even sites of $|\psi(t)\rangle$ in the Pauli-X basis, producing the state $|\psi_{out}(t)\rangle$ for a given measurement outcome. Then the remaining odd sites have a correlation function $$\langle \psi_{out}(t)|Z_{2m-1}Z_{2(m+n)-1}|\psi_{out}(t)\rangle \sim e^{-n/\xi} \qquad \text{Equation 25}$$

Define $$\alpha = \cos^2(2t). \text{ If } n \gg \frac{1-\alpha}{1+\alpha},$$

then the correlation length $\xi$ is normally distributed (corresponding to the randomness of measurement), $\xi \sim N(\bar{\xi}, \sigma_\xi)$, with the following mean and standard deviation:

$$\bar{\xi} = \frac{2}{(1+\alpha)\ln\left(\frac{1+\alpha}{1-\alpha}\right)} \text{ and } \sigma_\xi = \frac{\bar{\xi}}{\sqrt{n}}\sqrt{\frac{1-\alpha}{1+\alpha}}. \qquad \text{Equation 26}$$

Before proving this result, let us make a few observations:

1. For the special case $t=0$ (i.e., $\alpha=1$), one recovers $\bar{\xi}=0$ for the product state, whereas the cluster state at $t=t_{SPT}$ (i.e., $\alpha=0$) gives rise to a true cat state with $\bar{\xi}=\infty$.
2. Expanding around $t=t_{SPT}+\delta t$ (i.e., around $\alpha=0$), one find $$\bar{\xi} = \frac{1}{\alpha} - 1 + O(\alpha).$$

The correlation length thus blows up as $$\bar{\xi} \sim \frac{4t_{SPT}^2}{\pi^2}\frac{1}{(\delta t)^2}$$

upon approaching $t \to t_{SPT}$.

Figure 6:
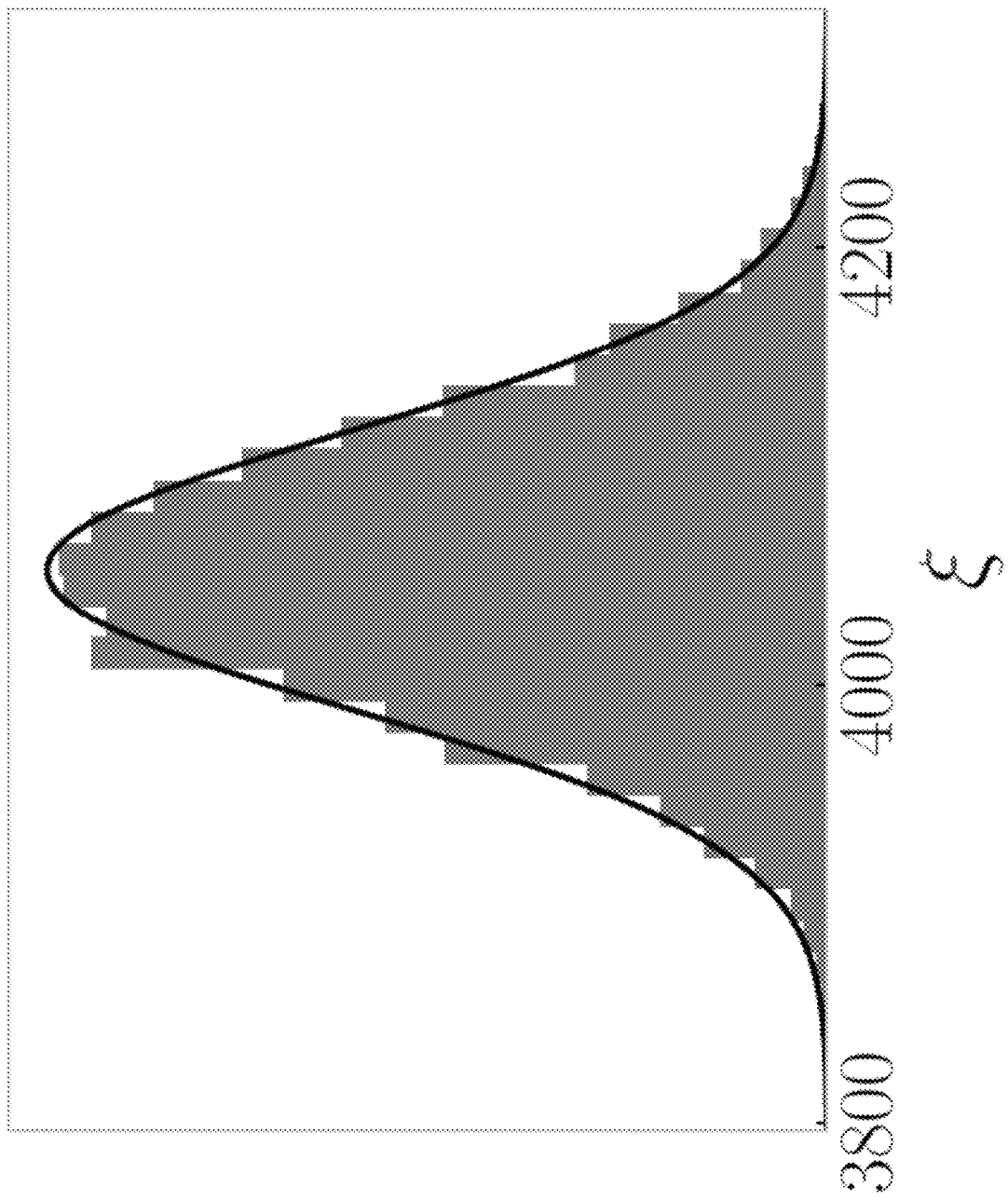
FIG. 6 is a plot of a distribution of the correlation length $\xi$ over a distance $n=\bar{\xi}$ for $t=0.99 \times t_{SPT}$. The black line is the predicted normal distribution.

3. For all t, we see that $\sigma_\xi \to 0$ as $n \to \infty$. However, for practical purposes it can be meaningful to set $n=\bar{\xi}$ to get a sense of how the correlation length will vary over physically relevant length scales. An example is shown in FIG. 6 for $t=0.99t_{SPT}$, where one finds that the deviations around $\bar{\xi} \approx 4000$ are small.
4. The plot in FIG. 6 corresponds to $\bar{\xi}$ with a thickness of one standard deviation where $n=\bar{\xi}$ has been chosen.

Proof Firstly, since the time-evolution is implemented using a purely-diagonal nearest-neighbor Ising Hamiltonian, the X-correlations are uncorrelated beyond two sites. More precisely, $\langle \psi(t)|\prod_{n\in S} X_{2n}|\psi(t)\rangle = \prod_{n\in S}\langle \psi(t)|X_{2n}|\psi(t)\rangle$ for any set of operators that does not include all even operators. Hence, if one measures X on all even sites (leaving out one for convenience), then the state with outcome $X_{2n}=s_{2n}$ can be written as $$|\psi_{out}(t)\rangle = \prod_n \frac{X_{2n}+s_{2n}}{\sqrt{2-2\alpha s_{2n}}}|\psi(t)\rangle \qquad \text{Equation 27}$$

where $\alpha := |\langle X\rangle| = \cos^2(2t)$.

From this, one can derive that $$|\langle \psi_{out}|Z_{2m-1}Z_{2n+1}|\psi_{out}\rangle| = \prod_{k=m}^{n}\left(\frac{1-\alpha}{1+\alpha}\right)^{\frac{1-s_{2k}}{2}}. \qquad \text{Equation 28}$$

For instance, this follows from the factorization property $\langle Z_{2m-1}Z_kZ_kZ_{2n+1}\rangle = \langle Z_{2m-1}Z_k\rangle\langle Z_kZ_{2n+1}\rangle$ and a direct calculation for the simplest case $n=m$.

Hence, it can be seen that the correlation length on the odd sites is given by $$\xi = \frac{1}{\ln\left(\frac{1+\alpha}{1-\alpha}\right)} \times \frac{1}{\rho} \qquad \text{Equation 29}$$

where $\rho$ is the fraction of measured sites between the two Z-operators which have an outcome $s=-1$. If one considers all possible measurement outcomes, then $\rho \times n$ is described by a binomial distribution B (n,p) where n is the number of even sites between two Z-operators, and $$p = \frac{1+\alpha}{2}$$

is the probability of having outcome $s=-1$. Hence, for large n, p is described by the normal distribution $N(\rho, \sigma)$ with standard deviation $$\sigma = \sqrt{\frac{p(1-p)}{n}}.$$

Hence, if $$\sigma \ll p\left(\text{i.e. } n \gg \frac{1}{p} - 1 = \frac{1-\alpha}{1+\alpha}\right),$$

then $1/\rho$ is normally distributed as $N(1/p, \sigma/p^2)$.

Details for Preparing Cluster and GHZ State in 1D

Consider 1D chain with N atoms with spacing a:

$$H(\Omega, h) = \frac{\Omega}{2}\sum_{n=1}^{N} X_n - \frac{h}{2}\sum_{n=1}^{N} Z_n + \frac{V(a)}{4}\sum_{n=1}^{N}\sum_{k\geq 1} v_k Z_n Z_{n+k}$$

$$\text{with } h = \delta + V(a)\sum_{k\geq 1} v_k \qquad \text{Equation 30}$$

In the nearest-neighbor model described herein, $v_{n>1}=0$; in the single-species model $v_n=1/n^6$; in the dual species (where even and odd sites have different species), $v_{2n-1}=1/(2n-1)^6$ and $v_{2n}=0$. However, the formulas will be valid for general $v_k$.

Of interest is the time-evolution with the interaction term over a time $$t_{SPT} = \frac{\pi}{V(a)}.$$

In particular, consider the following unitary operator:

$$U_{SPT} := e^{-it_{SPT}H(0,0)} = e^{-\frac{i\pi}{4}\sum_n \sum_{k\geq 1} v_k Z_n Z_{n+k}} \qquad \text{Equation 31}$$

This is referred to as the SPT-pulse. Indeed, in the nearest-neighbor model $v_k=\delta_{k,1}$, this would create the ideal cluster SPT phase, a state which is denoted by |cluster⟩ and which is the ground state of the cluster model, $H_{cluster}=-\Sigma_n Z_{n-1}X_n Z_{n+1}$.

Realizing the Cluster State

Starting from the ground state of $H(+\infty, 0)$ and then applying the SPT-pulse, the state being creating is:

$$|\psi\rangle = U_{SPT}|-\rangle^{\otimes N} = \qquad \text{Equation 32}$$

$$\prod_n \prod_{k\geq 2}\left[\cos\left(\frac{\pi v_k}{4}\right) - i\sin\left(\frac{\pi v_k}{4}\right)Z_n Z_{n+k}\right]|\text{cluster}\rangle$$

From this, various exact properties of the resulting state can be derived:

$$\mathcal{F}_{SPT} = \sqrt[N]{|\langle\text{cluster}|\psi\rangle|^2} \geq \prod_{k=2}^{\infty}\cos^2\left(\frac{\pi v_k}{4}\right) \qquad \text{Equation 33}$$

$$\langle\psi|Z_{m-1}X_m Z_{m+1}|\psi\rangle = \prod_{k=2}^{\infty}\cos^2\left(\frac{\pi v_k}{2}\right) \qquad \text{Equation 34}$$

$$\langle\psi|X_n|\psi\rangle = \langle\psi|Y_n|\psi\rangle = \langle\psi|Z_n|\psi\rangle = 0 \qquad \text{Equation 35}$$

$$\langle\psi|X_n X_{n+2}|\psi\rangle = \frac{c_2^2 t_3^2}{2}\sum_{\sigma=0,1}(-1)^\sigma \prod_{k=3}^{\infty}\left[c_k^4(1+(-1)^\sigma t_{k-1}t_{k+1})^2\right]. \qquad \text{Equation 36}$$

The inequality in the first formula is true for $v_k$ which decay fast enough with k (such as in the Rydberg case $v_k=1/k^6$). The other three formulas are true for all $v_k$. In the latter formula, we the shorthand is introduced $c_k$: $=\cos(\pi v_k/2)$ and $t_k$: $=\tan(\pi v_k/2)$.

These formulas are straightforwardly evaluated. First consider the single-species model $v_k=1/k^6$. In this case, a fidelity per site of $\mathcal{F}_{SPT}\geq 0.99985$, i.e., which is very close to the ideal cluster state. E.g., even for N=100 atoms, the fidelity|⟨cluster|ψ⟩|²≈0.985. Relatedly, the stabilizer defining the cluster state also has a very large value: $\langle\psi|Z_{m-1}X_m Z_{m+1}|\psi\rangle \approx 0.9994$. Moreover, $$\langle\psi|X_n|\psi\rangle = 0 \text{ and } |\langle\psi|X_n X_{n+2}|\psi\rangle| < 10^{-10}. \qquad \text{Equation 37}$$

This means that measuring in the X-basis on, say, the even sites essentially corresponds to a completely uncorrelated flat distribution (to an extremely good approximation).

Creating the GHZ State Through Measuring Half the System

Turning now to measuring $X_n$ on every odd site. Due to Equation 37, the resulting state is $$|\psi_{proj}\rangle \approx \prod_n \frac{s_{2n-1} + X_{2n-1}}{\sqrt{2}}|\psi\rangle, \qquad \text{Equation 38}$$

where $s_n$ is the measurement outcome. Note that after judiciously chosen single-site flips, one can write $$|\psi_{proj}\rangle \approx \prod_n \frac{1 + X_{2n-1}}{\sqrt{2}}|\psi\rangle. \qquad \text{Equation 39}$$

From this, it follows that $|\langle GHZ|\psi_{proj}\rangle|^2 \geq |\langle SPT|\psi\rangle|^2$. I.e., a good fidelity for the cluster state implies a good fidelity for the GHZ state after preparation. E.g., for the above cluster fidelity of ≈0.985 for 100 atoms, we find a lower bound| $\langle GHZ|\psi_{proj}\rangle|^2 \geq 0.97$. However, it turns out that this underestimates the true result. In addition, this can be improved by noting that the correction due to the second-nearest neighbor can be removed by a single-site rotation.

Modified Stabilizer

Consider the effect of $v_2$, leading to the state $$|\psi\rangle = \exp\left(-\frac{i\pi v_2}{4}\Sigma Z_n Z_{n+2}\right)|\text{cluster}\rangle. \qquad \text{Equation 40}$$

This is still a $\mathbb{Z}_2\times\mathbb{Z}_2$ SPT, so measuring, for example, the even sites should give a cat state on the odd sites. To see this, rewrite $$|\psi\rangle = \prod_n \exp\left(-\frac{i\pi v_2}{4}Z_{2n-1}Z_{2n+1}\right)\prod_n \exp\left(-\frac{i\pi v_2}{4}X_{2n+1}\right)|\text{cluster}\rangle \qquad \text{Equation 41}$$

Note there are no operators acting on the even sites. Hence, if one measures on the even sites, the projectors that project the state onto our measurement outcome commute with the above operators. The result is thus $$|\psi_{out}\rangle = \prod_n \exp\left(-\frac{i\pi v_2}{4}Z_{2n-1}Z_{2n+1}\right)\prod_n \exp\left(-\frac{i\pi v_2}{4}X_{2n+1}\right)|cat\rangle = U|cat\rangle,$$

Equation 42 where the |cat⟩ state is in the diagonal basis (its precise configuration depending on the measurement outcome). This is a demonstration of the fact that Ising couplings on a given sublattice still give rise to a true cat state.

Furthermore, note that this cat state is an eigenstate of the two-point function of $$UZ_{2m-1}U^\dagger = Z_{2m-1}\prod_n \exp\left(-\frac{i\pi v_2}{4}Z_{2n-1}Z_{2n+1}\right)$$

Equation 43

$$\exp\left(\frac{i\pi v_2}{2}X_{2m-1}\right)\prod_n \exp\left(\frac{i\pi v_2}{4}Z_{2n-1}Z_{2n+1}\right)$$

$$= Z_{2m-1}\Big(\cos(\pi v_2/2) +$$

Equation 44

$$i\sin(\pi v_2/2)X_{2m-1}\exp\left(\frac{i\pi v_2}{2}Z_{2m-3}Z_{2m-1}\right)\exp\left(\frac{i\pi v_2}{2}Z_{2m-1}Z_{2m+1}\right)\Big)$$

$$= cZ_{2m-1} - sY_{2m-1}(c + isZ_{2m-3}Z_{2m-1})(c + isZ_{2m-1}Z_{2m-3})$$ Equation 45

$$= cZ_{2m-1} - sY_{2m-1} + O(s^2)$$ Equation 46 where $c=\cos(\pi v_2/2)$ and $s=\sin(\pi v_2/2)$. This means that the Ising order parameter has simply been rotated, which can be undone by applying a field.

Preparation of Other Long-Range Entangled States

Here other states of interest are presented which can be prepared with the disclosed protocol. The first example is discussed in detail. The other examples work analogously.

Xu-Moore Model (Subsystem Symmetry Breaking)

Figure 7:
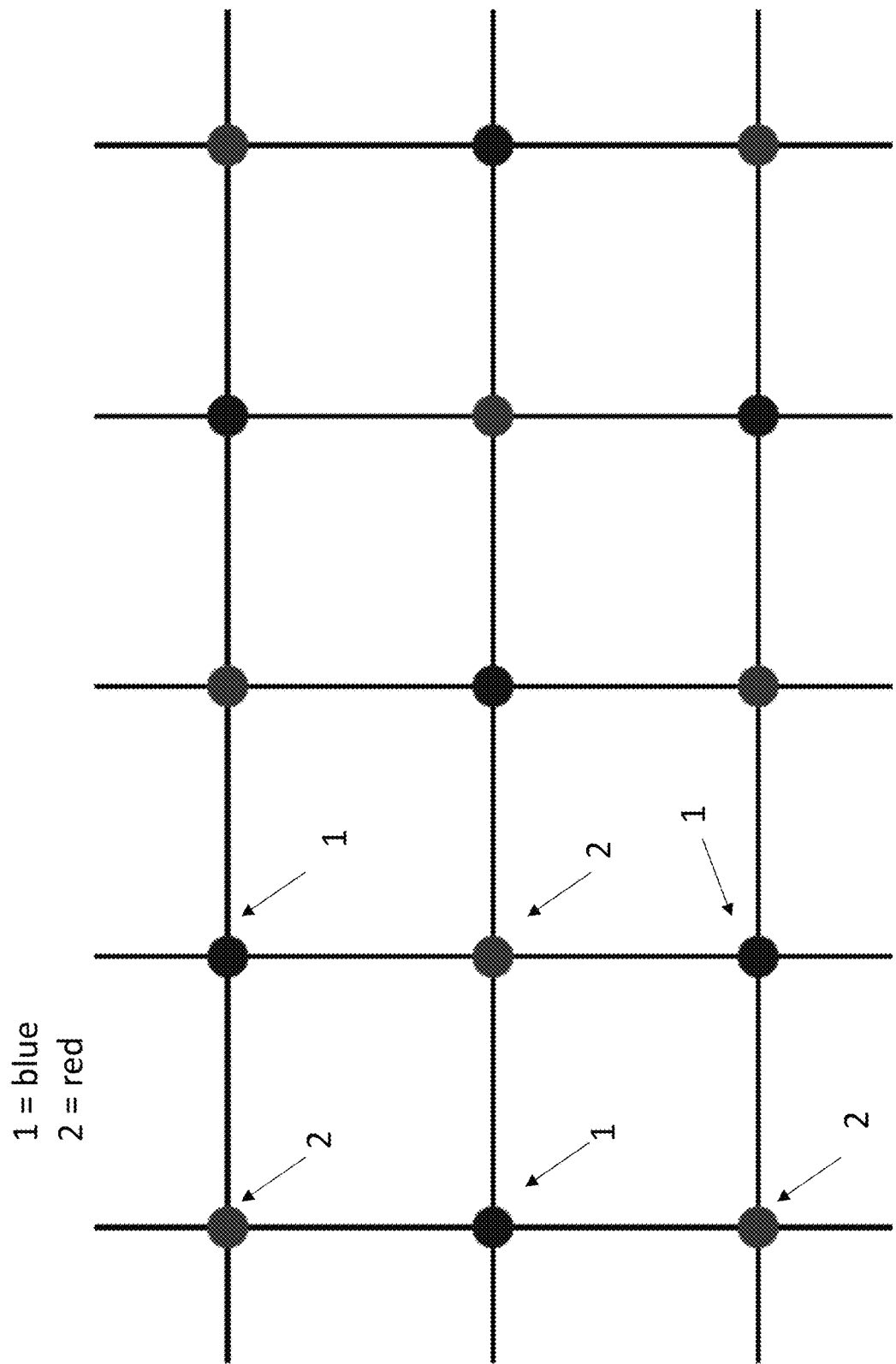
FIG. 7 depicts two sublattices of a square lattice.

Consider the square lattice with the two sublattices (A is red, B is blue) shown in FIG. 7.

The other states of interest are presented which can be prepared with the protocol described herein. The first example is discussed in detail. The other examples work analogously.

Start with a product state $|+\rangle^{\otimes(N_A+N_B)}$ and time-evolve it with the nearest-neighbor Ising Hamiltonian $H=J\Sigma_{(n,m)}Z_nZ_m$ for a time $$t_{SPT} = \frac{\pi}{4|J|}$$

(for simplicity we now set J=1); the resulting state is a cluster state on the above graph, with stabilizer $X_v\Pi_{v'\in \partial v}Z_{v'}=1$ (where $v'\in \partial v$ denotes that v and v' are nearest neighbors). Upon measuring the A sublattice in the X basis, the Xu-Moore state is obtained on the B sublattice with $\Pi_{v\in} Z_v=\pm 1$, depending on the measurement outcome. Note that this state corresponds to spontaneous breaking of subsystem symmetries independent of measurement outcome. Acting with judiciously chosen $\Pi X_v$ can make it into the homogeneous Xu-Moore state with $\Pi_{v\in} Z_v=+1$.

Despite not having topological order, this is an interesting state with exotic correlations. In particular, there is long-range order for four-point functions of Z if they form a rectangle on the tilted square lattice, whereas one-, two- and three-point functions will vanish. This is thus an analogue of the Schrödinger cat state with infinitely many branches in the wavefunction.

Rydberg Implementation: Single-Species

If a single species of Rydberg atoms is used (all targeted for the same Rydberg state), then the Rydberg excited states at different sites will interact with a potential $V(r)=U/r^6$. Hence, the first correction to the cluster stabilizer is at the diagonal distance $r=\sqrt{2}a$, giving a stabilizer $$\left\langle X_v\prod_{v'\in\partial v}Z_{v'}\right\rangle \approx \cos^4\left(\frac{\pi}{2\sqrt{2}^6}\right) \approx 0.93.$$

Equation 47

Figure 8:
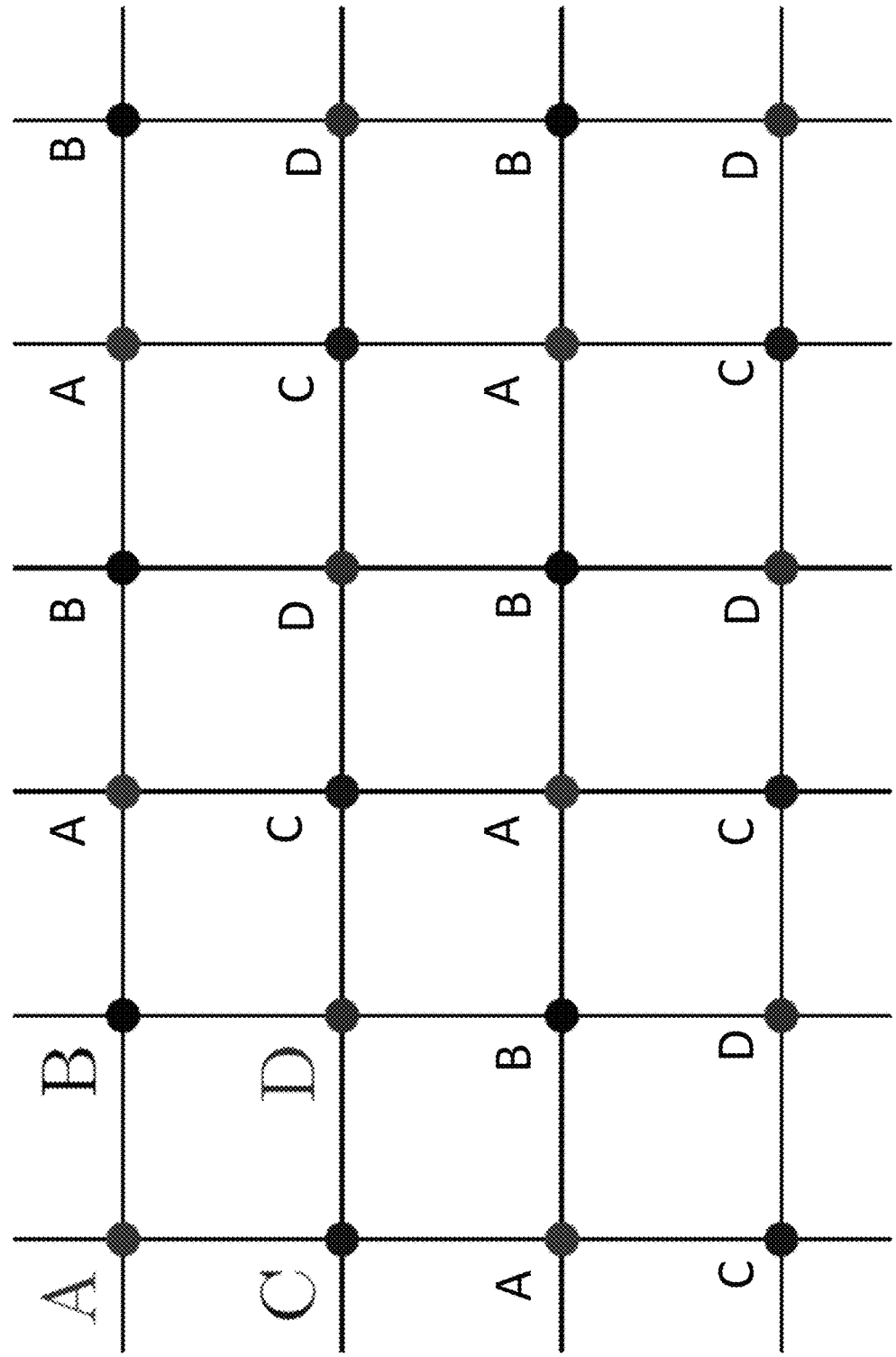
FIG. 8 depicts four sublattices of a square lattice.

However, this can be drastically improved by using local addressing, where it is presumed that individual pulses can be applied on the four sublattices shown in FIG. 8 (here A is subdivided into A and D; similarly we split B into B and C).

Eventually, the A and D atoms are measured after preparing the cluster state. Spin flips $\mathcal{X}_\lambda=\Pi_{v\in\lambda}X_v$ (for any of the sublattices A=A, B, C, D) can be effectively generated by time-evolving the X-term by $\pi/2$. If U(t) denotes time-evolving with the Ising interaction of the system, consider the following combined evolution:

$$\mathcal{X}_A\mathcal{X}_CU(\pi/8)\mathcal{X}_A\mathcal{X}_DU(\pi/8)\mathcal{X}_C\mathcal{X}_DU(\pi/4)$$ Equation 48

This effectively generates a $t=\pi/4$ evolution for the Ising couplings connecting AB, AC, CD, BD, a t=0 evolution for AD and BC couplings, and a $t=\pi/2$ evolution for AA, BB, CC, DD couplings. In particular, this entirely eliminates the diagonal corrections (of length $\sqrt{2}$). The result is a stabilizer $$\left\langle X_v\prod_{v'\in\partial v}Z_{v'}\right\rangle \approx \cos^4\left(2\times\frac{\pi}{2\times 2^6}\right) \approx 0.9952.$$

Equation 49

The extra factor of two arose from these contributions adding up over all time-evolutions. Including further corrections, a more precise answer is obtained:

$$\left\langle X_v\prod_{v'\in\partial v}Z_{v'}\right\rangle \approx$$

Equation 50

$$\cos^4\left(2\times\frac{\pi}{2\times 2^6}\right)\times\cos^8\left(\frac{\pi}{2\sqrt{5}^6}\right)\times\cos^4\left(2\times\frac{\pi}{2\sqrt{8}^6}\right) \approx 0.9945,$$

confirming that the result is barely changed by including further corrections.

Rydberg Implementation: Dual-Species

Now consider a dual-species implementation, where the same-sublattice (AA and BB) couplings can be made negligible. Then the first correction is at a distance $r=\sqrt{5}a$, leading to the cluster stabilizer:

$$\left\langle X_v\prod_{v'\in\partial v}Z_{v'}\right\rangle \approx \cos^8\left(\frac{\pi}{2\sqrt{5}^6}\right)\times\cos^4\left(\frac{\pi}{2\times 3^6}\right) \approx 0.9994.$$

Equation 51

2D Color Code

A protocol for obtaining the toric code on the honeycomb lattice is discussed above (which required putting qubits on the sites and bonds of the honeycomb lattice). Similarly, the color code can be created on the honeycomb lattice, which requires putting qubits on the sites of the dice lattice. The resulting stabilizers for the dual-species set-up are:

$$\left\langle X_v \prod_{b \in v} Z_b \right\rangle \approx \cos^6\left(\frac{\pi}{2\Delta 2^6}\right) \times \cos^6\left(\frac{\pi}{2 \times \sqrt{7}^6}\right) \times \cdots \approx 0.998 \qquad \text{Equation 52}$$

$$\langle B_p \rangle \approx \cos^{18}\left(\frac{\pi}{2 \times 2^6}\right) \times \cos^{36}\left(\frac{\pi}{2 \times \sqrt{7}^6}\right) \times \cdots \approx 0.994 \qquad \text{Equation 53}$$

3D Toric Code on the Diamond Lattice

Figure 9:
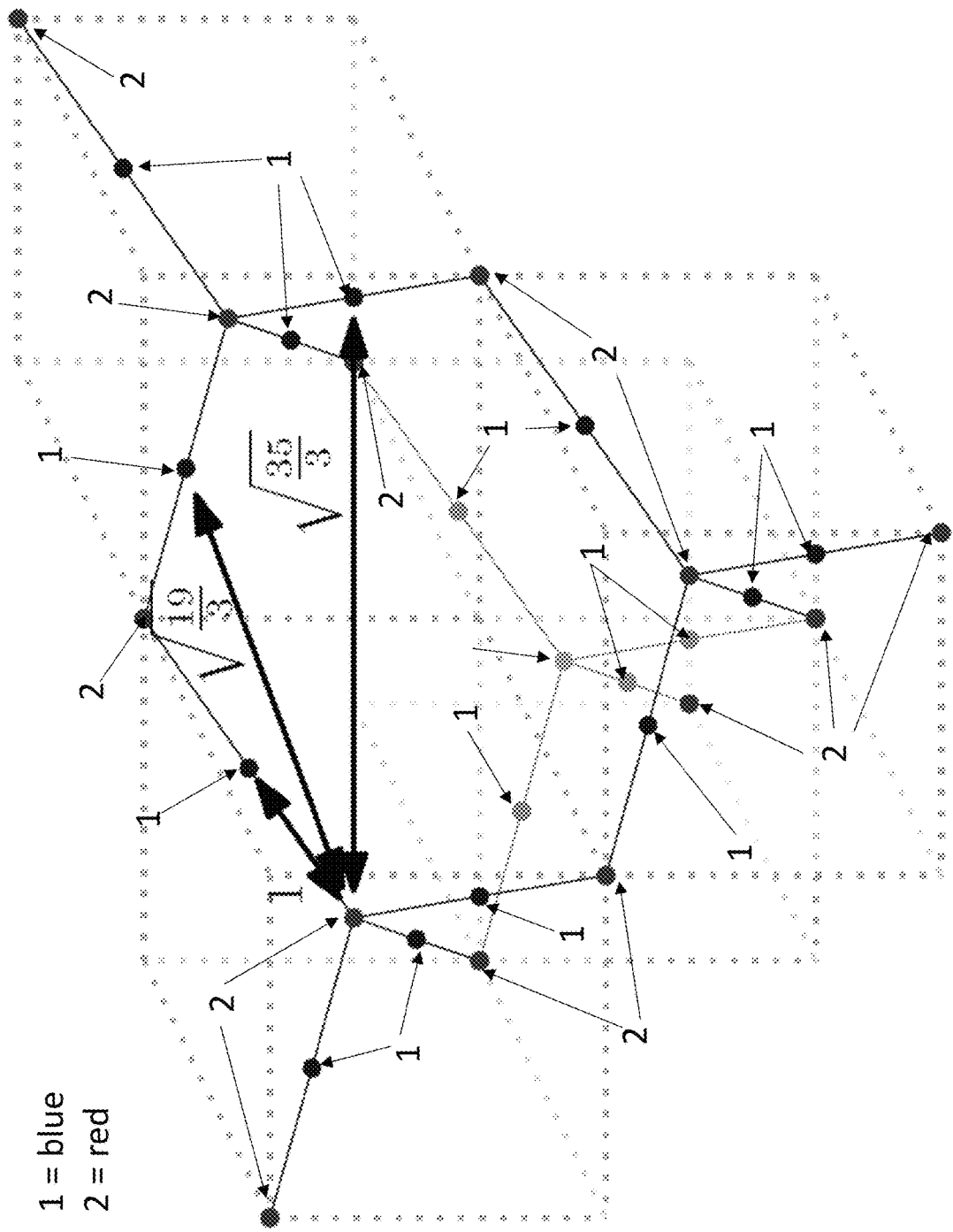
FIG. 9 illustrates a cluster state useful for obtaining a toric code on the diamond lattice having two sublattices.

Consider the 3D toric code. Instead of placing it on the usual cubic lattice, excellent results are obtained for the diamond lattice. In particular, referring to FIG. 9, consider the A sublattice to be the vertices of the diamond lattice, and the B sublattice the bonds. In the dual-species set-up, we then find:

$$\left\langle X_v \prod_{b \in tet} Z_b \right\rangle \approx \cos^{12}\left(\frac{\pi}{2 \cdot \sqrt{19/3}^6}\right) \times \cos^{24}\left(\frac{\pi}{2 \cdot \sqrt{35/3}^6}\right) \times \cos^{24}\left(\frac{\pi}{2 \cdot \sqrt{51/3}^6}\right) \times \cdots \approx 0.9998 \qquad \text{Equation 54}$$

$$\langle B_p \rangle \approx \cos^{18}\left(\frac{\pi}{2 \cdot \sqrt{19/3}^6}\right) \times \cos^{36}\left(\frac{\pi}{2 \cdot \sqrt{35/3}^6}\right) \times \cos^{36}\left(\frac{\pi}{2 \cdot \sqrt{51/3}^6}\right) (\times \cdots \approx 0.9996 \qquad \text{Equation 55}$$

To obtain the toric code on the diamond lattice, the cluster state is created on the above lattice and then measure the A (red) sublattice.

X-Cube Model

Figure 10A:
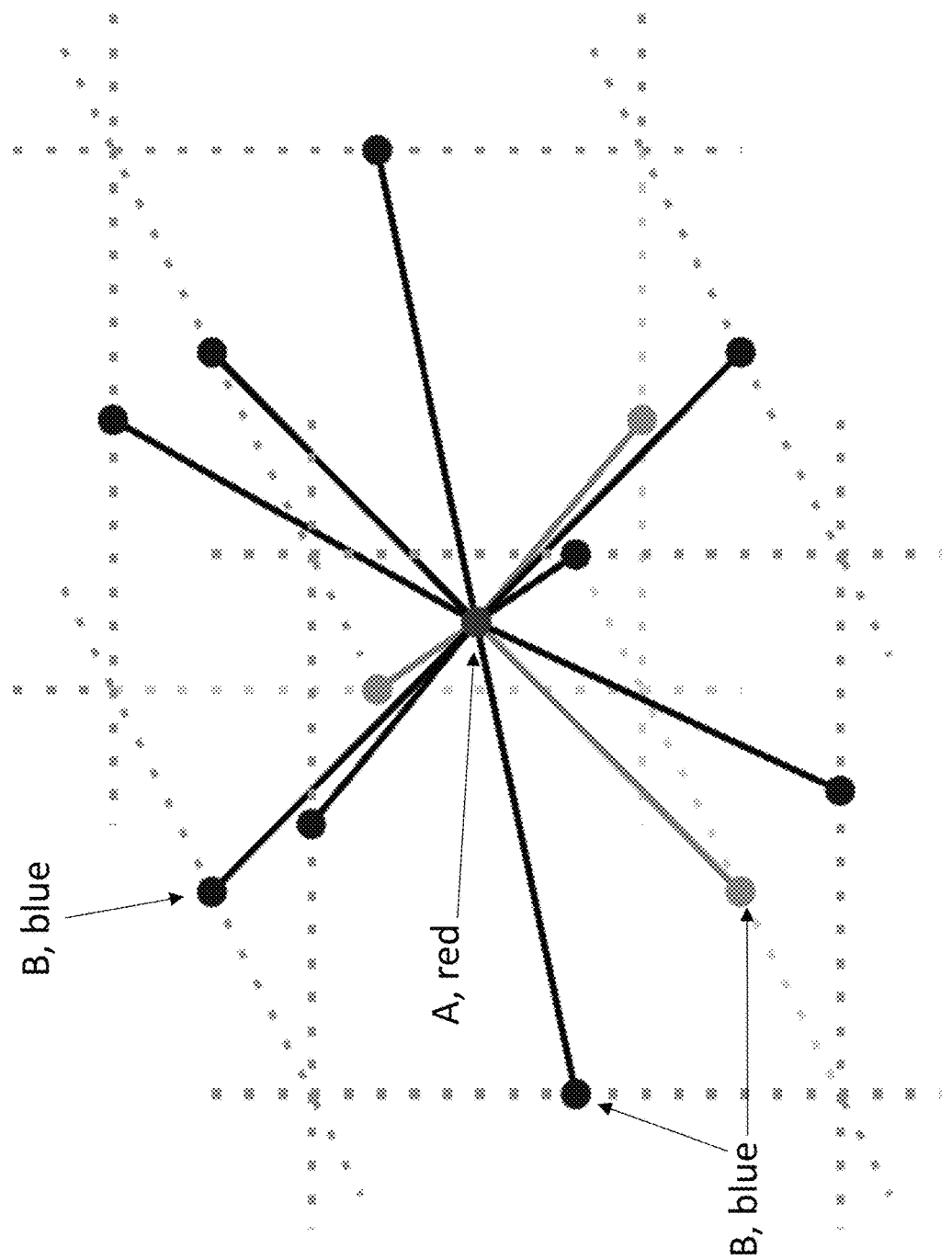
FIG. 10A and FIG. 10B, collectively, show the connectivity of the cluster state used to prepare the X-cube model. The A sites at the center of the cube (red) are connected to the B sites situated at the twelve edges surrounding the cube (blue). Together, they form the FCC lattice.
Figure 10B:
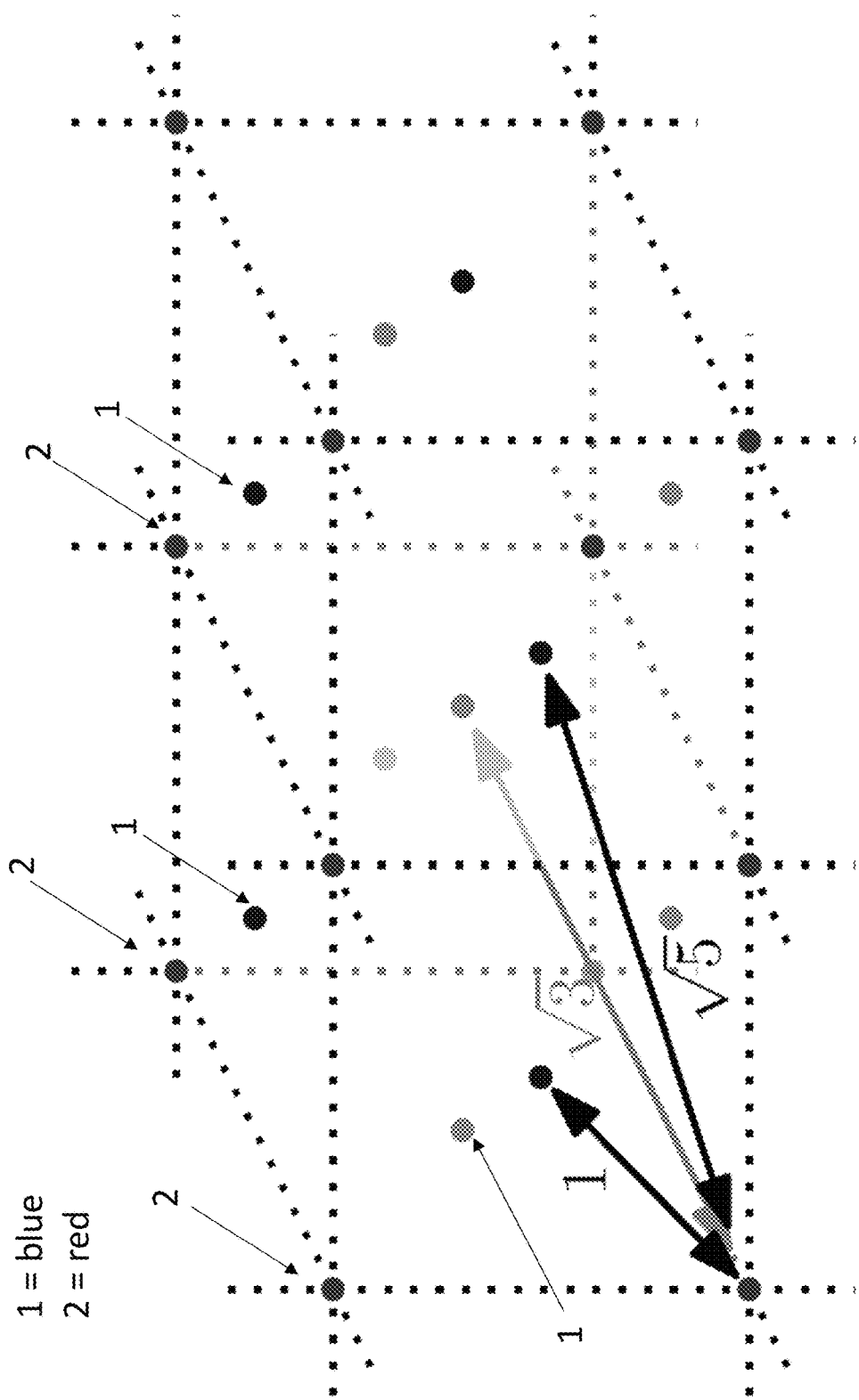

To realize the X-cube model, the A and B sublattices are taken to be the vertices and the faces centers of the FCC lattice, respectively (see FIG. 10A and FIG. 10B). Defining $A_c = \Pi_{b \in cube} Z_b$, we obtain for the dual-species set-up:

$$\langle X_v A_c \rangle \approx \cos^{24}\left(\frac{\pi}{2 \cdot \sqrt{3}^6}\right) \times \cos^{24}\left(\frac{\pi}{2 \cdot \sqrt{5}^6}\right) \approx 0.957 \qquad \text{Equation 56}$$

$$\langle B_p \rangle \approx \cos^{32}\left(\frac{\pi}{2 \cdot \sqrt{3}^6}\right) \times \cos^{32}\left(\frac{\pi}{2 \cdot \sqrt{5}^6}\right) \approx 0.944 \qquad \text{Equation 57}$$

Details for Preparing $S_3$ Topological Order

A formal outline of the preparation of $S_3$ topological order is provided below, followed by a discussion of the physical implementation in Rydberg atom arrays.

Formal Preparation

The preparation consists of two steps. Preparing the $\mathbb{Z}_3$ toric code by gauging a product state with $\mathbb{Z}_3$ symmetry, and further gauging the $\mathbb{Z}_2$ charge conjugation symmetry to obtain the $S_3$ topological order.

Figure 11:
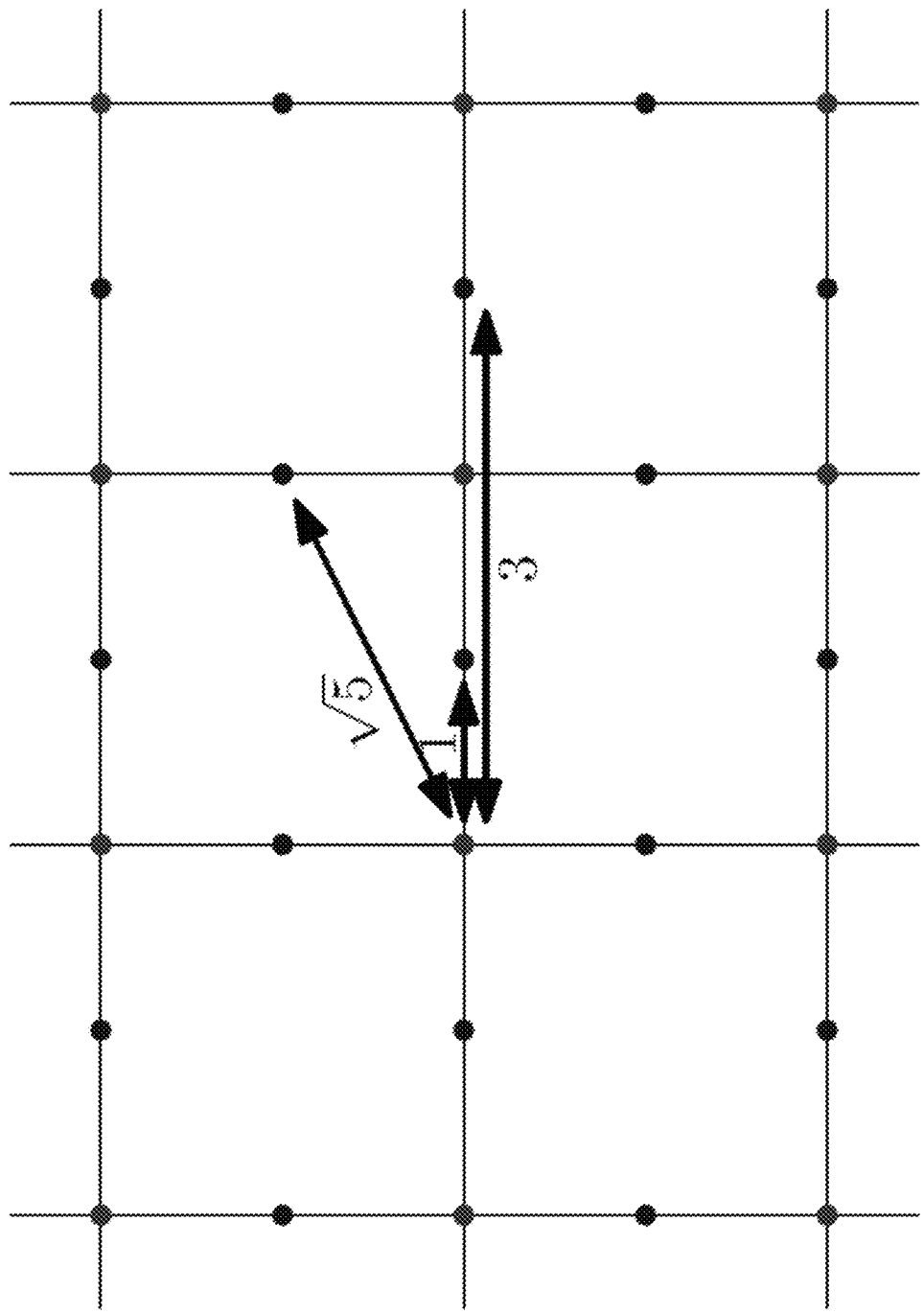
FIG. 11 depicts a Lieb lattice.

The lattice we will use in the first step is the so-called Lieb lattice with the A, B sublattice on the vertices and bonds of the square lattice, respectively (see FIG. 11). We denote $$\mathcal{X} = \begin{pmatrix} 0 & 0 & 1 \\ 1 & 0 & 0 \\ 0 & 1 & 0 \end{pmatrix} \quad \mathcal{Z} = \begin{pmatrix} 1 & 0 & 0 \\ 0 & \omega & 0 \\ 0 & 0 & \overline{\omega} \end{pmatrix} \quad C = \begin{pmatrix} 1 & 0 & 0 \\ 0 & 0 & 1 \\ 0 & 1 & 0 \end{pmatrix} \qquad \text{Equation 58}$$

to be the shift, clock, and charge conjugation of qutrits respectively. Here $\omega = e^{2\pi/3}$.

A qutrit is initialized in the state $$|+\rangle = \frac{|0\rangle + |1\rangle + |2\rangle}{\sqrt{3}},$$

which is an eigenstate of $\mathcal{X}$. Thus the state is uniquely specified by stabilizers $\mathcal{X}$ for every site. Next, an evolution is performed that creates the $\mathbb{Z}_3$ cluster state on this lattice. This cluster state can be viewed as an SPT protected by a $\mathbb{Z}_3$ global symmetry and a $\mathbb{Z}_3$ 1-form symmetry. The unitary is given by $$U_{AB} = \prod_{\langle a,b \rangle} C\mathcal{Z}_{ab} \qquad \text{Equation 59}$$

where $C\mathcal{Z} = \omega^{n^a n^b}$, is the controlled—Z gate. Conjugating by this unitary, the stabilizers are given by FIG. 12.

Figure 13:
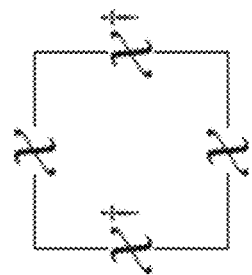
FIG. 13 shows a stabilizer of the ground state of the $\mathbb{Z}_3$ toric code.
Figure 13:
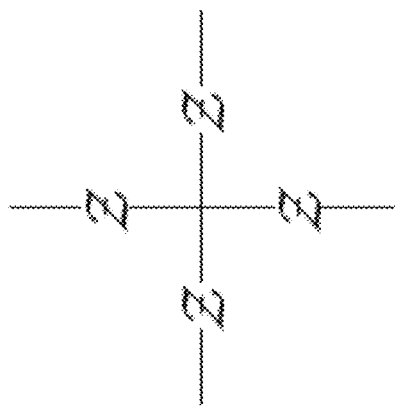

Next a measurement is performed on the A sublattice in the $\mathcal{X}$ basis. In the ideal case, when all measurement outcomes are $|+\rangle$, the ground state of the $\mathbb{Z}_3$ toric code is obtained, given by stabilizers shown in FIG. 13. The other measurement outcomes which are eigenstates of $\mathcal{X}$ signify the presence of e and $\overline{e}$ anyons of the toric code, which can be paired up and annihilated via local unitaries.

Figure 14:
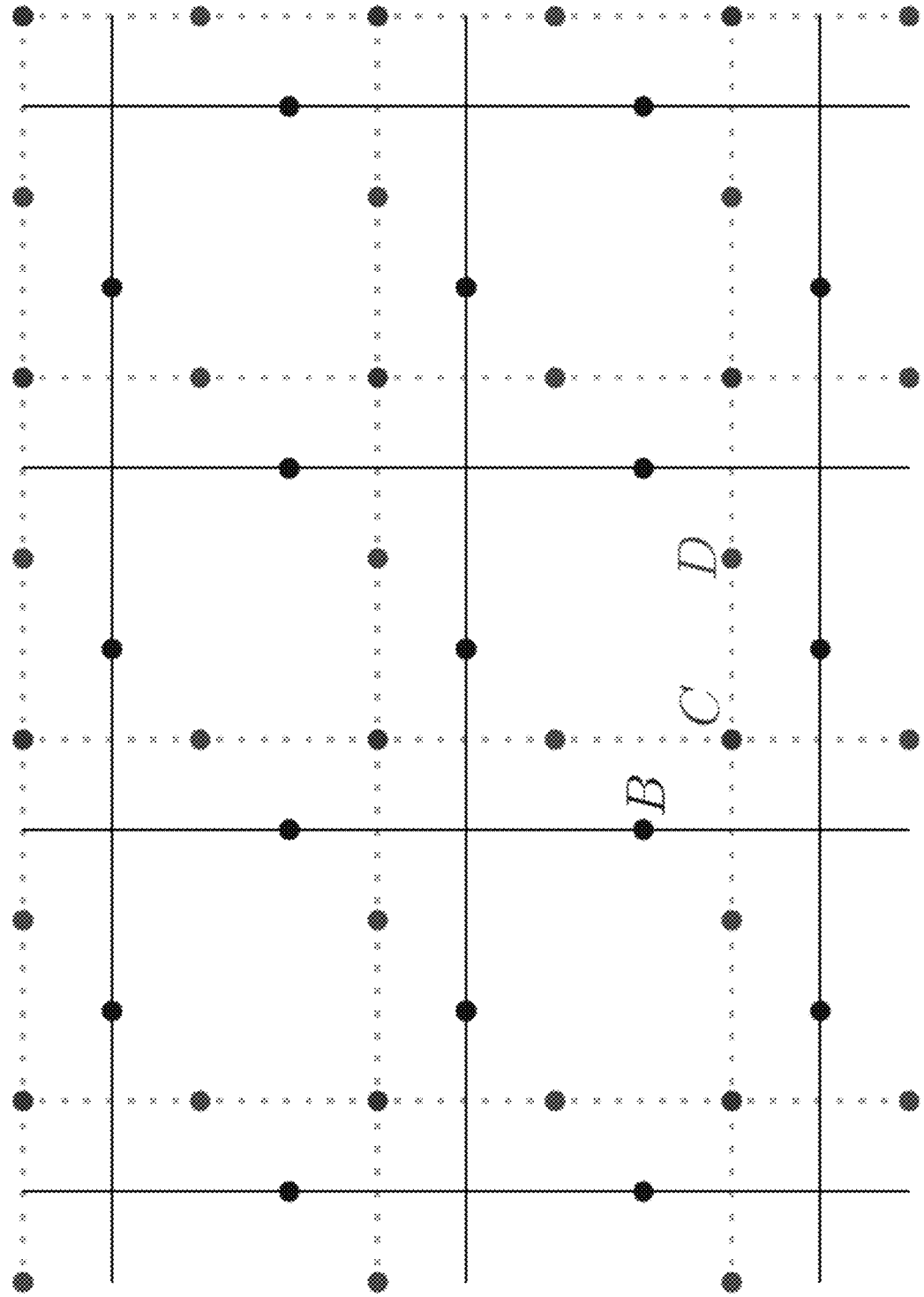
FIG. 14 depicts sublattices C (red) and D (purple) which form a shifted Lieb lattice (dotted lines) are added. Each site hosts a qubit.

The toric code wavefunction respects a global charge conjugation symmetry $\Pi_B \mathcal{C}$. In order to gauge this symmetry, add two additional sublattices C and D as shown in FIG. 14. The additional sublattices consist of qubits initialized with stabilizers X. C is used to perform a symmetry transformation so that the charge conjugation symmetry acts as $\Pi_c$ X. From this, this $\mathbb{Z}_2$ symmetry can be gauged by coupling the C and D lattices using the $\mathbb{Z}_2$ cluster state entangler and measuring the C sublattice.

The symmetry transformation we will perform will exchange the following symmetries $$\prod_B X \leftrightarrow \prod_B X \prod_C C \qquad \text{Equation 60}$$

Figure 15:
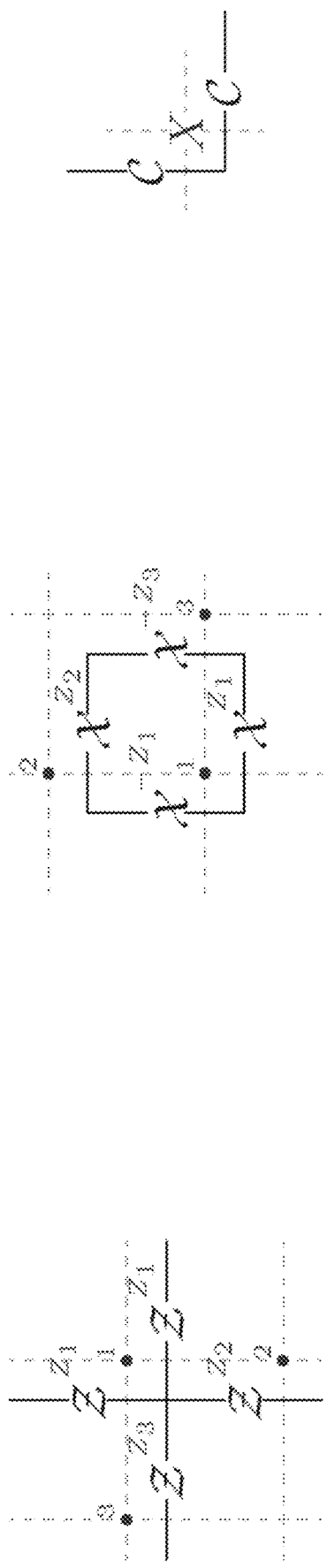
FIG. 15, FIG. 16, and FIG. 17 collectively show stabilizers used for preparation of $S_3$ topological order.

The latter enriches the $\mathbb{Z}_3$ toric code by charge conjugating both e and m anyons. The unitary that achieves this transformation is given by $$U_{BC} = \prod_{\langle b,c \rangle} CC_{cb} \qquad \text{Equation 61}$$

where $\langle bc \rangle$ denotes nearest neighbor sites of $b \in B$ and $c \in C$, and $CC_{cb}$ is the controlled-$\mathcal{C}$ gate where c is the control. The stabilizers are now given by FIG. 15.

We then couple the C and D sublattices with a $\mathbb{Z}_2$ cluster state. This is achieved via $$U_{CD} = \prod_{\langle c,d \rangle} CZ_{cd} \qquad \text{Equation 62}$$

Figure 16:
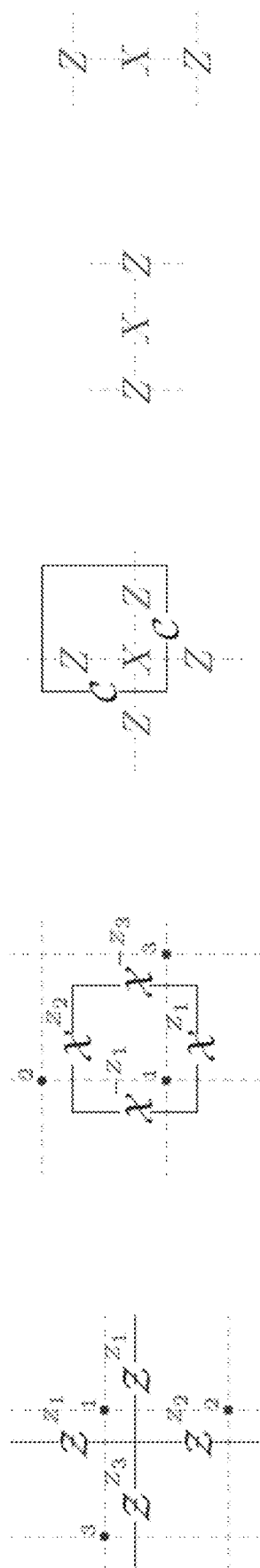

At this stage the stabilizers of the wavefunction are given by FIG. 16.

Figure 17:
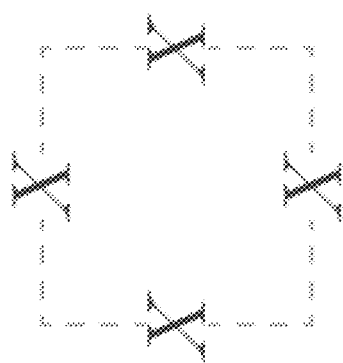
Figure 17:
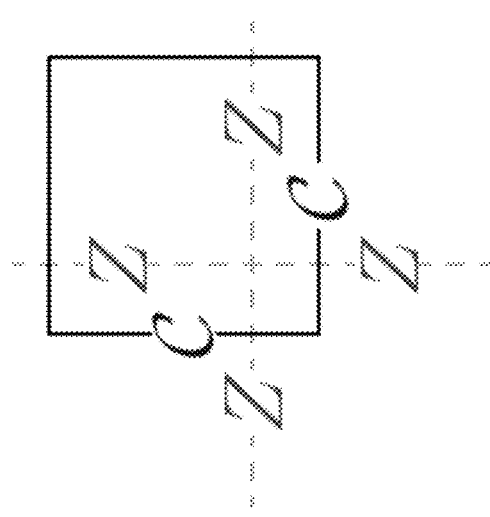

Now, we perform a measurement on the C sublattice. It is clear that the following vertex and plaquette terms constructed from the order two stabilizers are stabilizers of the final model, as shown in FIG. 17.

On the other hand, the order three stabilizers do not commute. Call the first $\mathbb{Z}_3$ stabilizer $A_v$. We note that $$\frac{1 + A_v + A_v^\dagger}{3}$$

is a projector for the wavefunction that commutes with the measurement X on the C sublattice. Therefore, the resulting projector after the measurement can be written down. Denote the number operator of the four qutrits according to the cardinals $n_N$, $n_E$, $n_W$, $n_S$. Since the operator is diagonal, it acts on the basis states as $$A_v = \omega^{n_N Z_1 + n_E Z_1 + n_S Z_2 + n_W Z_3} \qquad \text{Equation 63}$$

Therefore, $$A_v + A_v^\dagger = 2\cos\left[\frac{2\pi}{3} Z_1(n_N + n_E + n_S Z_1 Z_2 + n_W Z_1 Z_3)\right] \qquad \text{Equation 64}$$

where we have pulled out a common factor $Z_1$. Since this operator has eigenvalues ±1, it can be removed from the cosine. We are left with $$A_v + A_v^\dagger = 2\cos\left[\frac{2\pi}{3} Z_1(n_N + n_E + n_S Z_1 Z_2 + n_W Z_1 Z_3)\right] \qquad \text{Equation 65}$$

$$= \omega^{n_N + n_E + n_S Z_1 Z_2 + n_W Z_1 Z_3} + h.c. \qquad \text{Equation 66}$$

Figure 18:
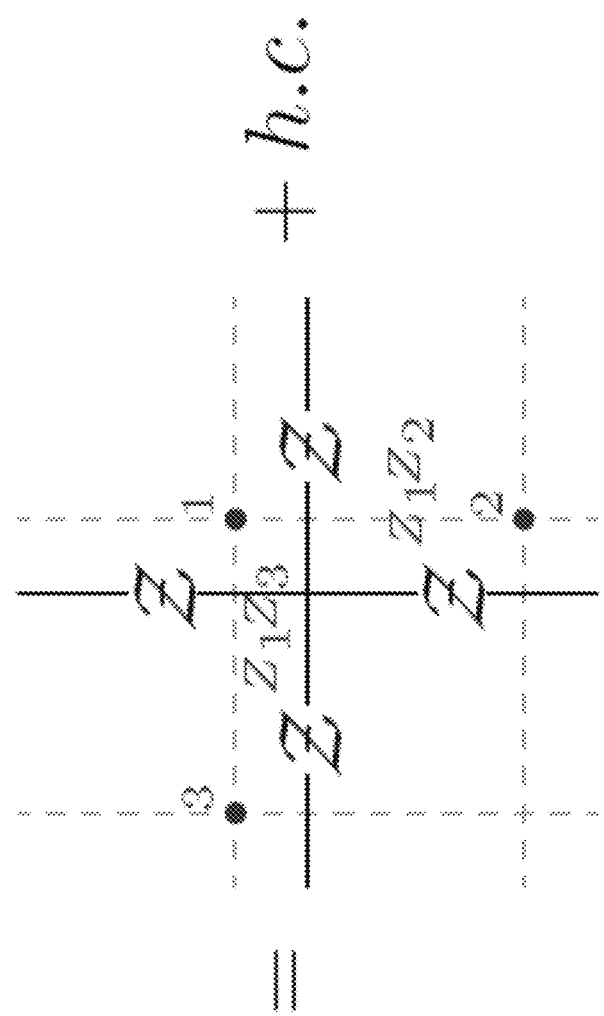
FIG. 18, FIG. 19, FIG. 20, FIG. 21, and FIG. 22 collectively depicts projectors used for preparation of $S_3$ topological order.

The result is schematically represented in FIG. 18.

Figure 19:
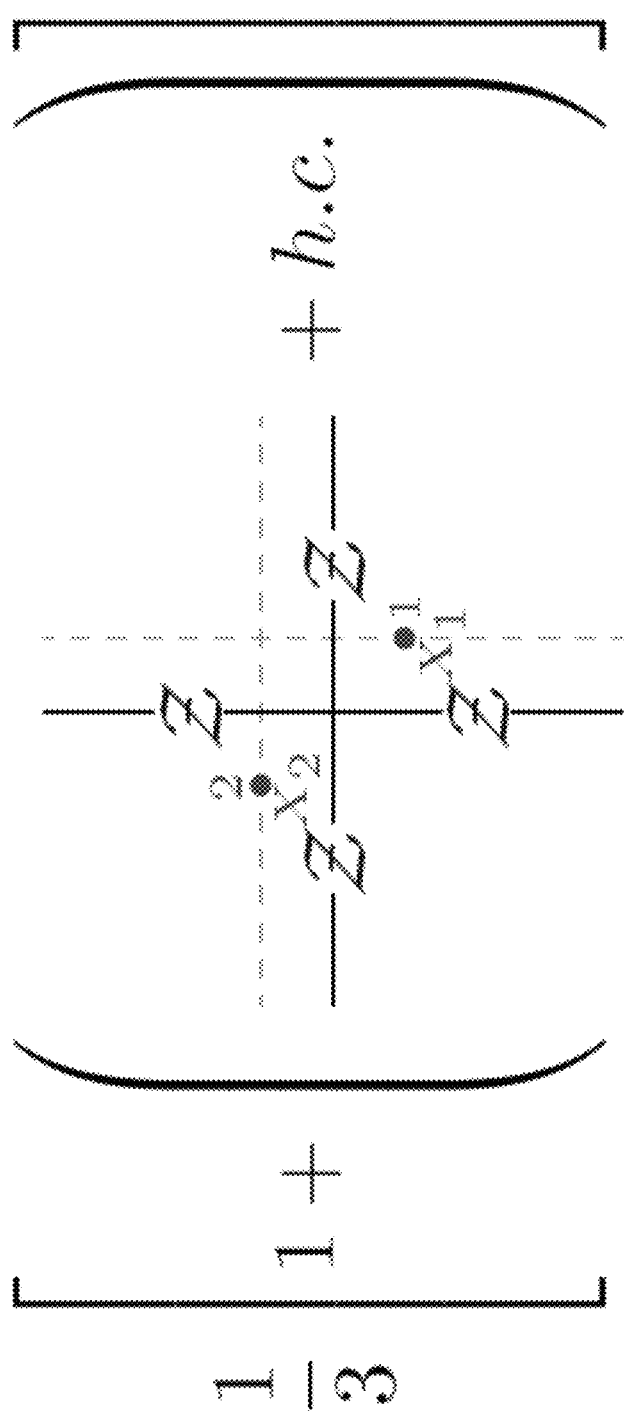

Therefore, combining with the order two stabilizers, the projector after the measurement is found to be the one schematically represented in FIG. 19.

Figure 20:
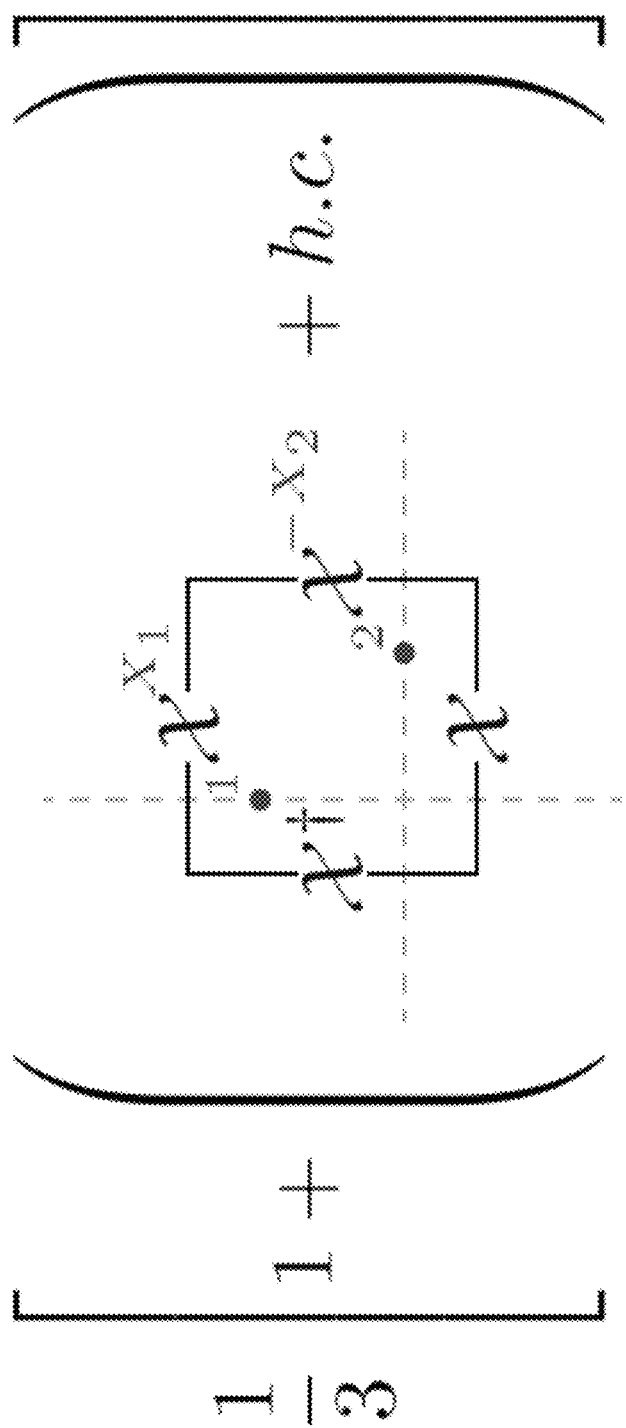

Similarly, the projector that results from the order three plaquette term after the measurement is schematically represented in FIG. 20.

Figure 21:
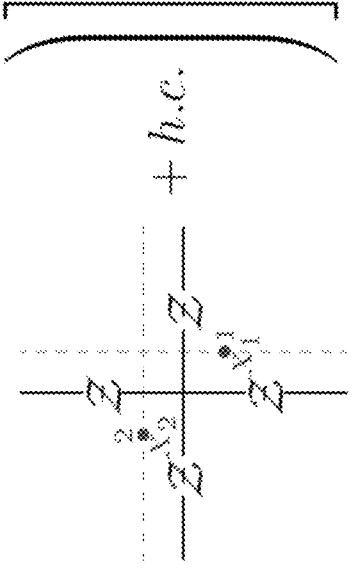
Figure 21:
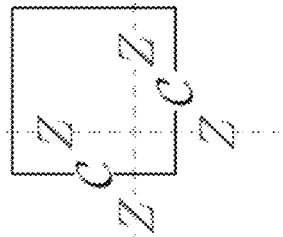
Figure 22:
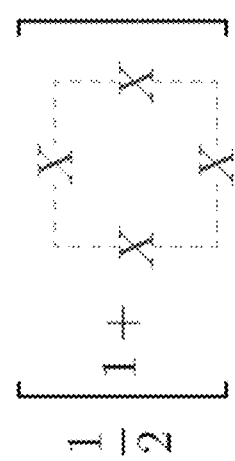
Figure 22:
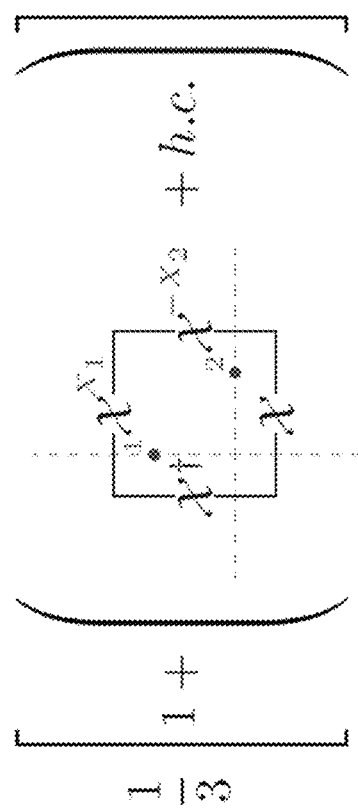

To conclude, the final wavefunction is not described by a stabilizer code, but instead by the following commuting projectors schematically represented in FIG. 21 and FIG. 22.

Relation to the Quantum Double Model $D(S_3)$

Figure 23:
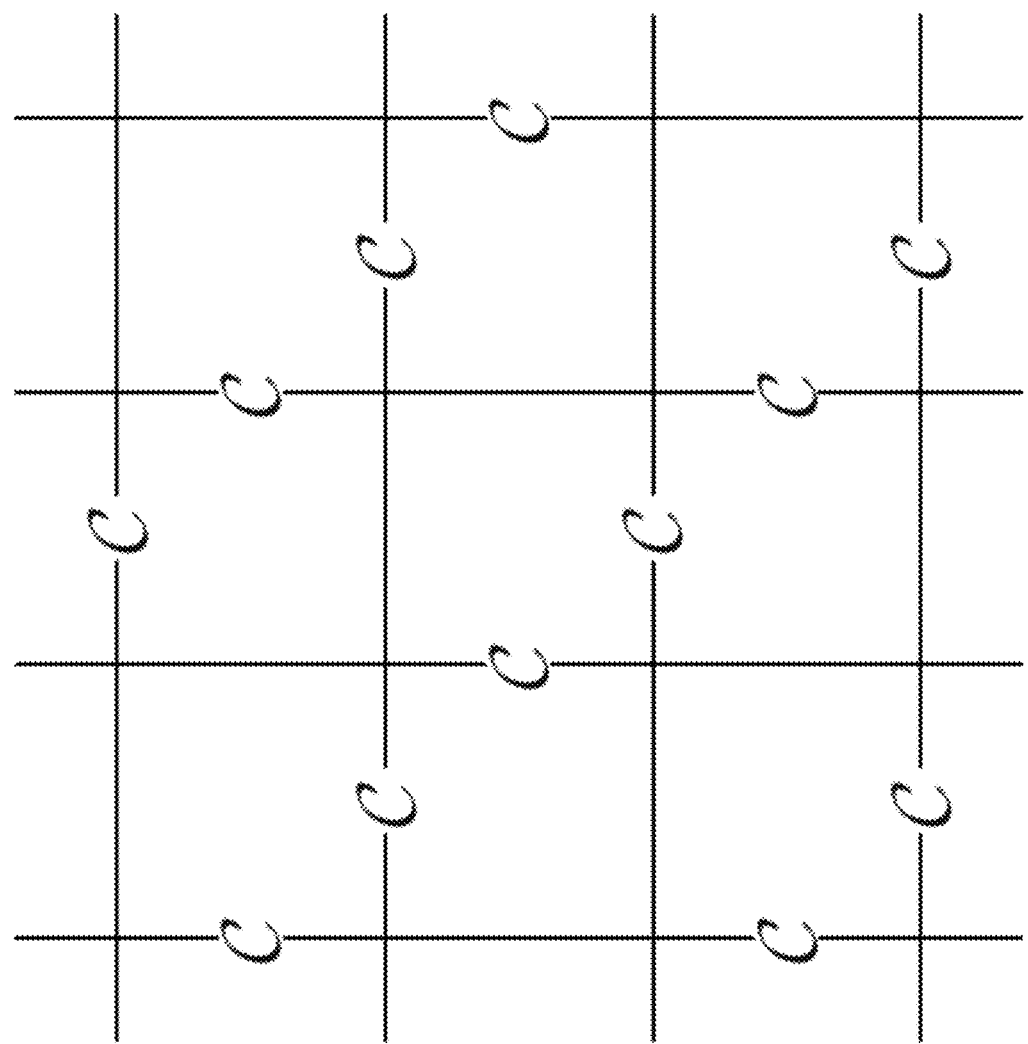
FIG. 23 depicts a pattern of C operators related to the quantum double model D(S3).

To make a connection to the quantum double model, the two square lattices are shifted so that they coincide. Each edge now has a Hilbert space of dimension six composed of a qutrit and a qubit. It is shown that the projectors can be mapped exactly to those of the quantum double model defined on the square lattice. To make the explicit connection, the following transformations (which mutually commute) are made:

1. Swap $\mathcal{Z}$ and $\mathcal{X}$ on all qutrits;
2. Swap Z and X on all qubits;
3. Apply charge conjugation $\mathcal{C}$ in the pattern shown in FIG. 23.

Figure 24:
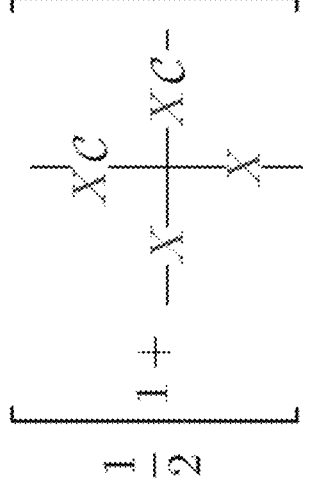
Figure 24:
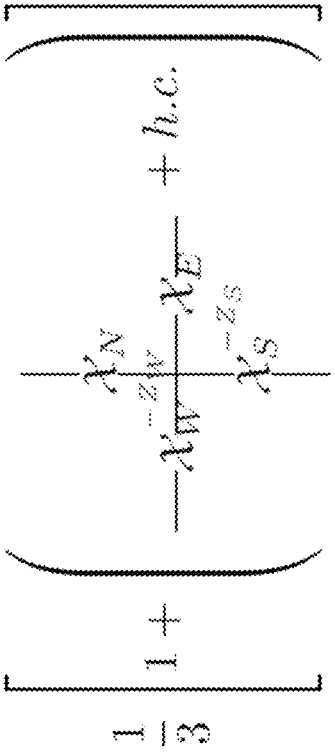

After the above transformations, the projectors take the form depicted schematically in FIG. 24 and FIG. 25.

Figure 26:
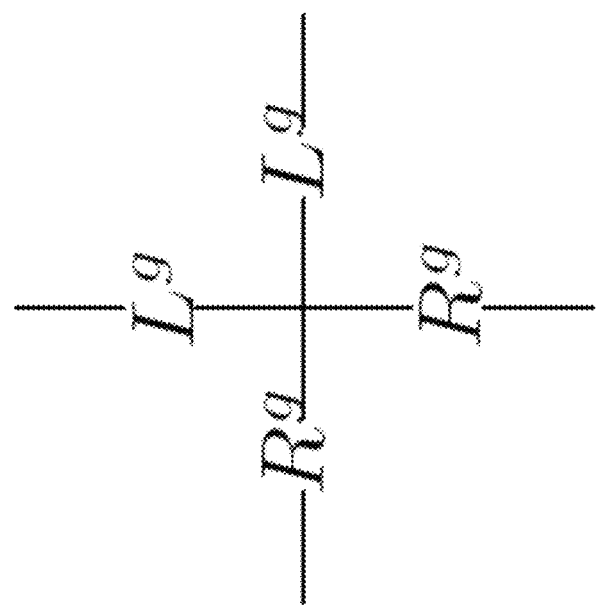
FIG. 26 and FIG. 27 are the vertex term and the plaquette terms, respectively, related to the quantum double model D(S3).
Figure 27:
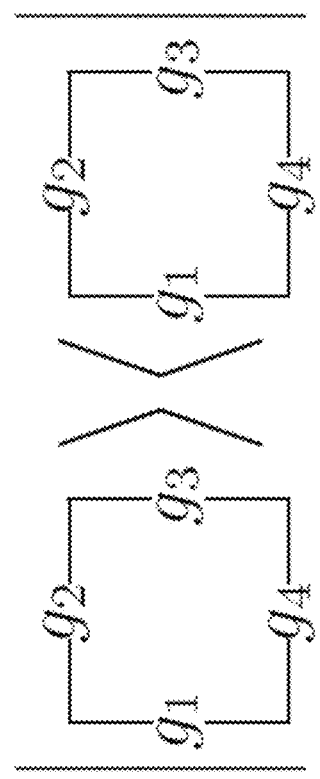

These are exactly the projectors of the quantum double model of $S_3$. The projectors for the quantum double model are the vertex term shown in FIG. 26 and the plaquette terms shown in FIG. 27, where $L^g$ and $R^g$ are left and right multiplication operators $$L^g|h\rangle = |gh\rangle \quad R^g|h\rangle = |h\bar{g}\rangle \qquad \text{Equation 67}$$

Represent the group $S_3$ using the generators r, s that satisfy $r^3 = s^2 = srsr = 1$. In the regular representation, the left and right multiplications of $S_3$ are 6×6 matrices, which can be explicitly written in terms of a qubit and a qutrit as $$L^r = I \otimes X \quad L^s = X \otimes C \qquad \text{Equation 68}$$

$$R^r = \mathcal{X}_I \oplus \mathcal{X} = \mathcal{X}^{-Z} R^s = X \otimes I \qquad \text{Equation 69}$$

Therefore, the product of our two vertex projectors is exactly A. Similarly, one can show that the product of our plaquette projectors is exactly $B_p$.

Implementation with Rydberg Atoms

To realize a qutrit on the A and B sublattices, each site is endowed with two Rydberg atoms, which will be called atoms 1 and 2. Due to the proximity of the atoms, the state where both atoms are excited is prohibited, giving an effective three-level system. Label the empty state as $|0\rangle$ and the state where atom 1 or 2 is excited as $|1\rangle$ or $|2\rangle$ respectively. On the other hand, the C and D sublattice will be the usual Rydberg two-level system: $|0\rangle$ for the ground state and $|1\rangle$ for the excited state.

Assuming local addressing, the following pulses for the qutrits can be performed:

$$X_1 = \begin{pmatrix} 0 & 1 & 0 \\ 1 & 0 & 0 \\ 0 & 0 & 0 \end{pmatrix}, Z_1 = \begin{pmatrix} 1 & 0 & 0 \\ 0 & -1 & 0 \\ 0 & 0 & 0 \end{pmatrix}, \qquad \text{Equation 70}$$

$$X_2 = \begin{pmatrix} 0 & 0 & 1 \\ 0 & 0 & 0 \\ 1 & 0 & 0 \end{pmatrix}, Z_2 = \begin{pmatrix} 1 & 0 & 0 \\ 0 & 0 & 0 \\ 0 & 0 & -1 \end{pmatrix}$$

which are the result of projecting the spin rotation operators into the qutrit subspace. These four generators are enough to generate arbitrary SU(3) rotations.

The preparation procedure can be summarized as follows:
1. Load the A and B sublattices and perform the $\mathbb{Z}_3$ fourier transform;
2. Implement $U_{AB}$ Equation 59;
3. Perform the inverse $\mathbb{Z}_3$ fourier transform on the A sublattice and measure the occupancy ($\mathbb{Z}_3$ toric code is obtained at this step);
4. Perform single site rotations to pair up charges in the $\mathbb{Z}_3$ toric code;
5. Load the C sublattice and perform Hadamard;
6. Implement $U_{BC}$ Equation 61;
7. Load the D sublattice and perform Hadamard;
8. Implement $U_{CD}$ Equation 62;
9. Perform Hadamard on the C sublattice and measure. ($S_3$ topological order is obtained at this step);
10. (optional) Perform single site rotations to pair up charges in the $S_3$ topological order.

Implementation of $U_{AB}$, $U_{BC}$, and $U_{CD}$ is discussed below.

$U_{AB}$

To create the $\mathbb{Z}_3$ cluster state, generate the unitary $U_{AB}$ in Equation 59.

The innate two-body interaction has dominated by the nearest neighbor sites between sublattices A and B, and is given by $$H_{AB}(U, U') = \sum_{\langle a,b \rangle} [U(n_{1,a}n_{1,b} + n_{2,a}n_{2,b}) + U'(n_{1,a}n_{2,b} + n_{2,a}n_{1,b})],$$ Equation 71 where it is presumed 1↔1 and 2↔2 are equidistant, as are 1↔2 and 2↔1. (One way of achieving this is by having the two atoms separated in the third direction.) Here, ⟨a, b⟩ denote nearest neighbors, and $n_1$ and $n_2$ denotes the occupancy of atoms 1 and 2, respectively. Note that by conjugating the number operator $n_i$ with a $$\frac{\pi}{2}$$

pulse of $X_j$ for j=1,2 gives $$e^{\frac{\pi i}{2}X_j} n_j e^{-\frac{\pi i}{2}X_j} = 1 - n_1 - n_2.$$ Equation 72

One can show that by successive applications of this substitution, as well as the freedom of tuning single-site chemical potentials, one can generate an effective evolution where U'=−U. In fact, if U'>U in Equation 71, the effective evolution will have U=−U'>0. If U'<U, one can simply exchange the 1↔2 labels on the A sublattice to reduce back to U'>U. In conclusion, we thus obtain the $C\mathcal{Z}$ gate $U_{AB}$ via $$U_{AB} = e^{-4\pi i/(3U)H(U,-U)}.$$ Equation 73

$U_{BC}$

To implement $U_{BC}$ in Equation 61, a basis transformation on the B sublattice is performed first, such that $\mathcal{C}$ is diagonal. A choice is $$U = e^{\frac{\pi i}{4}X_1} e^{\frac{\pi i}{4}Z_1} e^{\frac{\pi i}{2}X_2} e^{-\frac{\pi i}{2}Z_2}$$ Equation 74

$$\tilde{\mathcal{C}} \equiv U\mathcal{C}U^\dagger = \begin{pmatrix} -1 & 0 & 0 \\ 0 & 1 & 0 \\ 0 & 0 & 1 \end{pmatrix}$$ Equation 75

The leading order interactions between the B and C sublattices are of the form $$H_{BC} = \sum_{\langle bc \rangle} n_{1,b}n_c + n_{2,b}n_c$$ Equation 76

Since $$e^{\pi i n_c(n^{1,b}+n^{2,b})} = \text{diag}(1,1,1,1,-1,-1) = Z_c \cdot C\tilde{\mathcal{C}}_{c,b}$$ Equation 77 where $C\tilde{\mathcal{C}}$ is the controlled $\tilde{\mathcal{C}}$ gate, $$e^{\pi i H_{BC}} = \prod_{\langle b,c \rangle} C\tilde{\mathcal{C}}_{c,b}$$ Equation 78 where we used the property that for a fixed c ∈ C, there are only two nearest neighbors b ∈ B, thus cancelling away $Z_c$. To conclude, $$U_{BC} = \prod_{\langle b,c \rangle} C\mathcal{C}_{c,b} = U e^{\pi i H_{BC}} U^\dagger$$ Equation 79

$U_{CD}$ $U_{CD}$ in Equation 61 is the $\mathbb{Z}_2$ cluster state entangler between the C and D sublattices, so this can be implemented via the ordinary time evolution. However, one has to ensure that there is no net evolution between the pairs BC and BD. This can be done by flipping all C and D qubits halfway through the evolution. That is, $$U_{CD} = \left(\prod_{C,D} X\right) e^{\frac{\pi i}{2}H} \left(\prod_{C,D} X\right) e^{\frac{\pi i}{2}H}$$ Equation 80

Detailed Experimental Protocol in 1D

Start with a state $|\psi(0)\rangle$, which corresponds to all Rydberg atoms in the ground state. I.e., in the spin notation, $|\psi(0)\rangle = |\downarrow\rangle^{\otimes N}$. First apply an X-pulse to rotate this into a desired product state, after which apply the SPT-pulse. However, due to the interactions, this is not a pure on-site pulse. So to get a quantitatively correct description, one should first investigate the effects of this X-pulse. A useful identity:

$$\exp(A+\varepsilon B) = \exp(\varepsilon \int_0^1 e^{sA} B e^{-sA} ds + O(\varepsilon^2)) \times \exp A$$ Equation 81

We define the following quantities:

$$t_{prod} = \frac{\pi}{2\Omega}$$

$$e^{-iH(\Omega,0)t}$$

$$A = -i\frac{\pi}{4}\sum_n X_n$$

$$B = -i\sum_n Z_n Z_{n+1} + \ldots$$

$$\varepsilon = \frac{V(a)t}{4} = \frac{\pi V(a)}{8\Omega} \ll 1$$

Product State Pulse

So at leading order in E:

$$\exp(-iH(\Omega, 0)t_{prod}) =$$ Equation 82

$$\exp\left(-i\varepsilon \sum_n \int_0^1 e^{-is\frac{\pi}{4}\sum_m X_m} Z_n Z_{n+1} e^{is\frac{\pi}{4}\sum_m X_m} ds\right) \times \exp\left(-i\frac{\pi}{4}\sum_n X_n\right)$$

$$= \exp\left(-i\varepsilon \sum_n Z_n Z_{n+1} \int_0^1 e^{is\frac{\pi}{2}(X_n + X_{n+1})} ds\right) \times \exp\left(-i\frac{\pi}{4}\sum_n X_n\right)$$ Equation 83

Note:

$$\int_0^1 e^{is\frac{\pi}{2}(X_n + X_{n+1})} ds =$$ Equation 84

$$\int_0^1 \left[\cos\left(\frac{s\pi}{2}\right) + i\sin\left(\frac{s\pi}{2}\right)X_n\right]\left[\cos\left(\frac{s\pi}{2}\right) + i\sin\left(\frac{s\pi}{2}\right)X_{n+1}\right] ds$$

-continued $$= \int_0^1 \left[\cos^2\left(\frac{s\pi}{2}\right) - \sin^2\left(\frac{s\pi}{2}\right)X_n X_{n+1} + i\sin\left(\frac{s\pi}{2}\right)\cos\left(\frac{s\pi}{2}\right)(X_n + X_{n+1})\right]ds \quad \text{Equation 85}$$

$$= \frac{1}{2} - \frac{1}{2}X_n X_{n+1} + i\frac{1}{\pi}(X_n + X_{n+1}) \quad \text{Equation 86}$$

So at leading order in $\varepsilon$:

$$e^{-iH(\Omega,0)t_{prod}} = \quad \text{Equation 87}$$

$$\exp\left(-i\frac{\varepsilon}{2}\sum_n\left[Z_n Z_{n+1} + Y_n Y_{n+1} - \frac{2}{\pi}(Y_n Z_{n+1} + Z_n Y_{n+1})\right]\right) \times$$

$$\exp\left(-i\frac{\pi}{4}\sum_n X_n\right)$$

$$= \prod_n \exp\left(-i\frac{\varepsilon}{2}\left[Z_n Z_{n+1} + Y_n Y_{n+1} - \frac{2}{\pi}(Y_n Z_{n+1} + Z_n Y_{n+1})\right]\right) \times \quad \text{Equation 88}$$

$$\prod_n \exp\left(-i\frac{\pi}{4}X_n\right)$$

In the last step, Trotter factorization is used (which is accurate to order $\varepsilon$). (Note that the above directly extends to all interaction distances weighted by $v_k$!) The resulting state is $$|\psi(t_{prod})\rangle = e^{-iH(\Omega,0)t_{prod}}|\downarrow\rangle^{\otimes N} =$$

$$\prod_n \exp\left(-i\frac{\varepsilon}{2}\left[Z_n Z_{n+1} + Y_n Y_{n+1} - \frac{2}{\pi}(Y_n Z_{n+1} + Z_n Y_{n+1})\right]\right)\left(\frac{|\uparrow\rangle_n + i|\downarrow\rangle_n}{\sqrt{2}}\right)^{\otimes N} =$$

$$\exp\left(-i\frac{2\varepsilon}{V(a)}H(0,0)\right) \times \prod_n \underbrace{\exp\left(-i\frac{\varepsilon}{\pi}\left(Y_n Z_{n+1} + Z_n Y_{n+1}\right)\right)\left(\frac{|\uparrow\rangle_n + i|\downarrow\rangle_n}{\sqrt{2}}\right)^{\otimes N}}_{=:|\varphi\rangle}$$

This is a $\chi=2$ state! Note if $c=\cos(\varepsilon/\pi)$ and $s=\sin(\varepsilon/\pi)$, then $$|\phi\rangle = \prod_n (c - isY_{n-1}Z_n)(c - isZ_n Y_{n+1})\left(\frac{|\uparrow\rangle_n + i|\downarrow\rangle_n}{\sqrt{2}}\right)^{\otimes N} =$$

$$\prod_n (c^2 - s^2 Y_{n-1}Y_{n+1} - icsZ_n(Y_{n-1} + Y_{n+1}))\left(\frac{|\uparrow\rangle_n + i|\downarrow\rangle_n}{\sqrt{2}}\right)^{\otimes N}$$

From this, we see that:

$$\langle \varphi|Y_m|\phi\rangle = \cos\left(\frac{4\varepsilon}{\pi}\right) = 1 - \frac{8\varepsilon^2}{\pi^2} + O(\varepsilon^4)$$

at leading order in $\varepsilon$. Also, $$\sqrt[N]{|\langle +_y|\varphi\rangle|^2} = \cos^2\left(\frac{2\varepsilon}{\pi}\right) = 1 - \frac{4\varepsilon^2}{\pi^2} + O(\varepsilon^4)$$

SPT Pulse

Application of the SPT-pulse is now desirable over a time $$t = t_{SPT} - \frac{2\varepsilon}{V(a)} = \frac{\pi - 2\varepsilon}{V(a)}.$$

For the end result, one expects a state whose fidelity (per site) for the cluster state is approximately $$\mathcal{F} = \sqrt[N]{\langle \text{cluster}|\psi(t_{prod} + t_{SPT}-)\rangle} \approx \left(1 - \frac{4\varepsilon^2}{\pi^2}\right)\prod_{k=2}^{\infty}\cos^2\left(\frac{\pi v_k}{4}\right).$$

For the Rydberg case $v_k = 1/k^6$, we expect $\mathcal{F} \approx 0.9958$ for the choice $\varepsilon=0.1$, and $\mathcal{F} \approx 0.99981$ for $\varepsilon=0.01$. Doing the full numerical tensor-network simulation of the state preparation: $\mathcal{F} \approx 0.9956$ for $\varepsilon=0.1$ and $\mathcal{F} \approx 0.99981$ for $\varepsilon=0.01$. Note, the above fidelity is for the ground state of $H=\Sigma_n Z_{n-1}Y_n Z_{n+1}$, not $H=-\Sigma_n Z_{n-1}X_n Z_{n+1}$.

Pre-Measurement Pulse

Before measuring the even sites, rotation of those sites back to the z-basis is needed. I.e., time-evolution is desirable for a time $$t_{meas} = \frac{4\varepsilon}{V(a)} \text{ where } \Omega = -\frac{\pi V(a)}{8\varepsilon}$$

on even sites and $\Omega=0$ on odd sites.

The time-evolution operator takes the form:

$$\exp(-iHt_{meas}) = \exp\left(i\frac{\pi}{4}\sum_n X_{2n}\right) \times \exp\left(-i\varepsilon \sum_n \int_0^1 e^{-is\frac{\pi}{4}\Sigma_m X_{2m}} Z_n Z_{n+1} e^{is\frac{\pi}{4}\Sigma_m X_{2m}} ds\right)$$

$$= \exp\left(i\frac{\pi}{4}\sum_n X_{2n}\right) \times \exp\left(-i\varepsilon \sum_n Z_{2n}(Z_{2n-1} + Z_{2n+1})\int_0^1 e^{is\frac{\pi}{2}X_{2n}} ds\right)$$

$$= \exp\left(i\frac{\pi}{4}\sum_n X_{2n}\right) \times \exp\left(-i\varepsilon \sum_n Z_{2n}(Z_{2n-1} + Z_{2n+1})\frac{2}{\pi}(1 + iX_{2n})\right)$$

-continued $$= \exp\left(i\frac{\pi}{4}\sum_n X_{2n}\right) \times \exp\left(i\frac{2\varepsilon}{\pi}\sum_n Y_{2n}(Z_{2n-1} + Z_{2n+1})\right) \times \exp\left(-i\frac{8\varepsilon}{\pi V(a)}H(0,0)\right)$$

Here all equalities are up to order ε.

It can be seen that the product state pulse applies an SPT pulse for a time $$\frac{2\varepsilon}{V(a)}$$

and the pre-measurement pulse applies an SPT pulse for a time $$\frac{8\varepsilon}{\pi V(a)}.$$

Hence, if the goal is not to prepare the best cluster state, but instead to prepare the best GHZ state (after measuring the even sites), one should only apply the SPT pulse for a total time $$s = t_{SPT} - \frac{2\varepsilon}{V(a)} - \frac{8\varepsilon}{\pi V(a)} = \frac{\pi^2 - (2\pi + 8)\varepsilon}{\pi V(a)}$$

E.g., for ε=0.1, this reduces the total time from the naive $$\frac{\pi}{V(a)} \approx 3.14/V(a)$$

to a time≈2.69/V(a), i.e., a reduction by more than 14%, which is significant. (For ε=0.01, and a reduction by slightly over 1.4%).

Doing the full numerical simulation, for ε=0.01, a state was found with $(Z_{2n-1}Z_{2n}Z_{2n+1})\approx 0.9993$ and $(Z_{2n})<10^{-5}$ and $(Z_{2n}Z_{2n+2})<10^{-7}$. Measuring the even sites, and presuming it can be approximated as an equal weight distributions (as suggested by the aforementioned correlations), $\mathcal{F}\approx 0.99984$.

Addendum: SPT Model and Properties

Parent Hamiltonian for Equation 32 is $$H = \sum_n U_{SPT} X_n U_{SPT}^\dagger = -\sum_n Z_{n-1}X_n Z_{n+1} e^{i\frac{\pi}{2}Z_n \Sigma_{k\geq 2}v_k(Z_{n-k}+Z_{n+k})}$$

$$= -\mathcal{Z}\sum_n Z_{n-1}X_n Z_{n+1} \prod_{k\geq 2}\left(1 - t_k^2 Z_{n-k}Z_{n+k} + it_k Z_n(Z_{n-k} + Z_{n+k})\right)$$

$$= -\mathcal{Z}\sum_n \left[Z_{n-1}X_n Z_{n+1} + t_2 Z_{n-2}Z_{n-1}Y_n Z_{n+1} + t_2 Z_{n-1}Y_n Z_{n+1}Z_{n+2} - t_2^2 Z_{n-2}Z_{n-1}X_n Z_{n+1}Z_{n+2} + O(t_3)\right]$$

$$Z = \prod_{k=2}^{\infty}\cos^2(\pi v_k/2)$$

The first term that does not commute with $\mathbb{Z}_2\times\mathbb{Z}_2$ has prefactor $t_3=\tan(\pi v_3/2)$; for $v_k=1/k^6$, we have $t_3\approx 0.002$. This is thus an SPT to a very good approximation. One can perform MBQC up to this threshold. In particular, the exact χ=4 MPS state is up to the approximation where one neglects $t_3$ and higher orders.

Neglecting $t_3$ and higher orders, an exact SPT corresponding to the stabilizer is $$Z_{n-1}X_n Z_{n+1}\exp\left(i\frac{\pi}{128}(Z_{n-2}Z_n + Z_n Z_{n+2})\right)$$

One can ask what the fidelity is for the experimentally prepared state with respect to this X=4 SPT state. Approximately 0.999999. State:

$$A_\uparrow = \begin{pmatrix} \omega & 0 & 0 & 0 \\ i\bar\omega & 0 & 0 & 0 \\ 0 & -i\omega & 0 & 0 \\ 0 & -\bar\omega & 0 & 0 \end{pmatrix} \text{ and } A_\downarrow =$$

$$\begin{pmatrix} 0 & 0 & \bar\omega & 0 \\ 0 & 0 & i\omega & 0 \\ 0 & 0 & 0 & -i\bar\omega \\ 0 & 0 & 0 & -\omega \end{pmatrix} \text{ with } \omega = \exp\left(\frac{2\pi i}{512}\right) \approx 0.9999 + 0.0123i$$

Then $\sqrt[N]{\langle \chi = 4SPT|\psi\rangle} \approx 0.9999988$.

Close to $$\cos^2\left(\frac{\pi}{2^2\times 3^6}\right) \approx 1 - \frac{\pi^2}{2^4\times 3^{12}}.$$

Note: stabilizer and string order can also be measured in two-species experimental set-up.

What is the length-scale within which the experimentally-prepared state looks like a genuine SPT state? This is set by the failure of the state being symmetric under e.g. $\Pi_n X_{2n}$; it will mean that string order parameter will eventually decay exponentially to zero, with some length scale $\xi_{SPT}$. This can be obtained by looking at the largest eigenvalue of the mixed transfer matrix. The absolute value of this eigenvalue was found to be roughly 0.9999953, implying $\xi_{SPT}>200000$ in units of two-site unit cell, i.e., $\xi_{SPT}$ is bigger than four hundred thousand lattice sites. In fact, in the approximation where we set $v_k=0$ for $k\geq 5$, one can exactly calculate the above eigenvalue to be $\lambda=\cos(\pi v_3/2)$ (for $v_3\leq 1/2$), so for $v_3=1/3^6$ one obtains $$\xi_{SPT} = \frac{1}{\left|\ln\cos\left(\frac{\pi}{2\times 3^6}\right)\right|} \approx \frac{2^3 \times 3^{12}}{\pi^2} \approx 430770.$$

i.e., roughly half a million sites.

String correlation function for the $\chi=4$ MPS is $$\langle Z_{2m-1}X_{2m}X_{2m+2} \ldots X_{2n-2}X_{2n}Z_{2n+1}\rangle = \cos^2\left(\frac{\pi v_2}{2}\right) = \cos^2\left(\frac{\pi}{2^7}\right) \approx 0.9994$$

for any m≤n. Including all $v_k$, one expects to see the above string correlator for beyond which it decays exponentially to zero. (In contrast, the trivial string order decays to zero even for short distances.)

Kramers-Wannier and General Initial States

Figure 28:
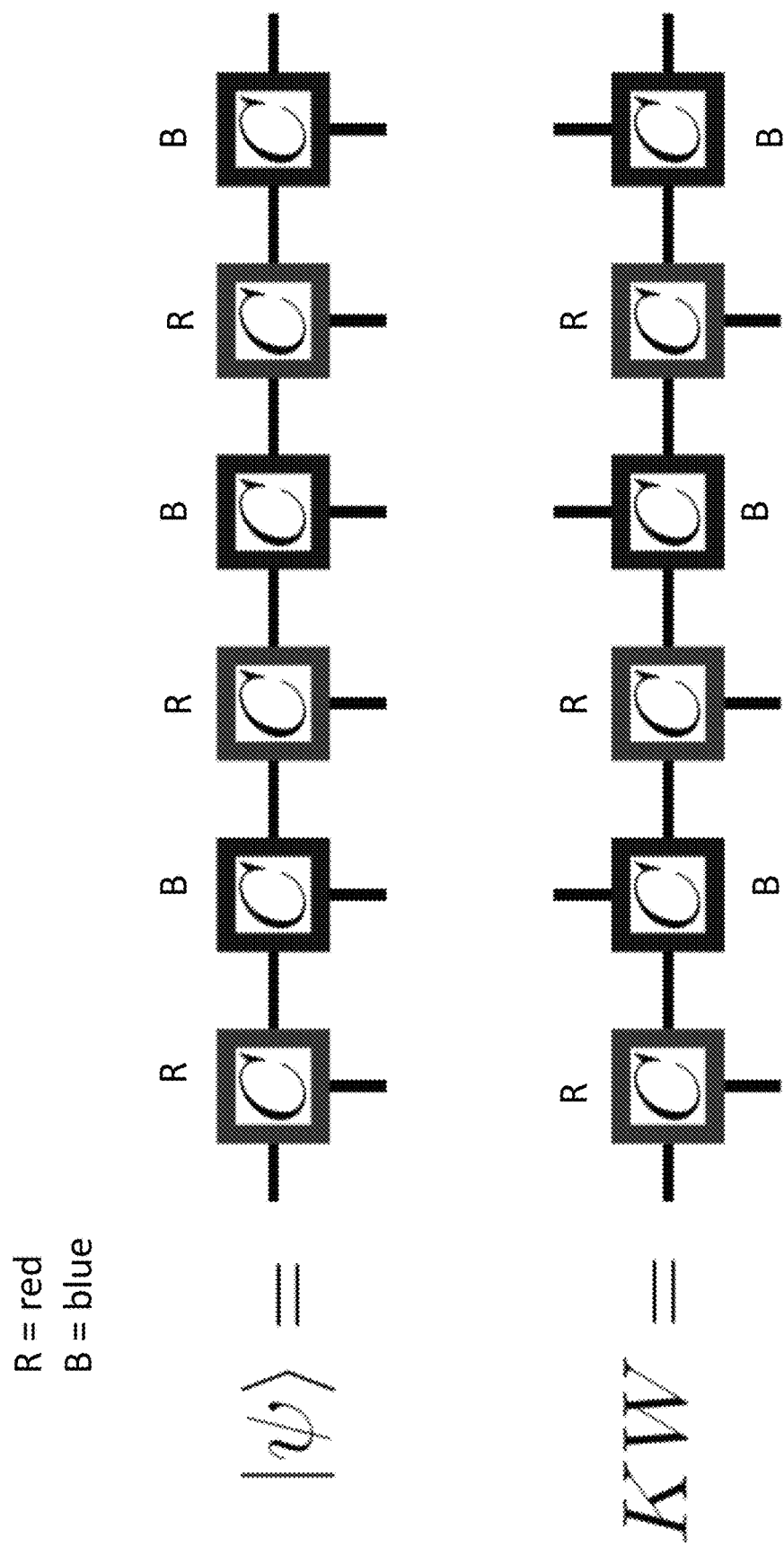
FIG. 28 depicts the relation between the Matrix-Product State representation of the cluster state and the Matrix-Product Operator representation of the Kramers-Wannier duality

Referring to FIG. 28, the KW MPO is obtained by starting with the MPS of the 1D cluster state flipping the legs on the B (blue) sublattice. Generalized KW dualities can be similarly obtained by a cluster state which is a non-trivial SPT protected by the desired symmetries on a bipartite lattice.

Figure 29:
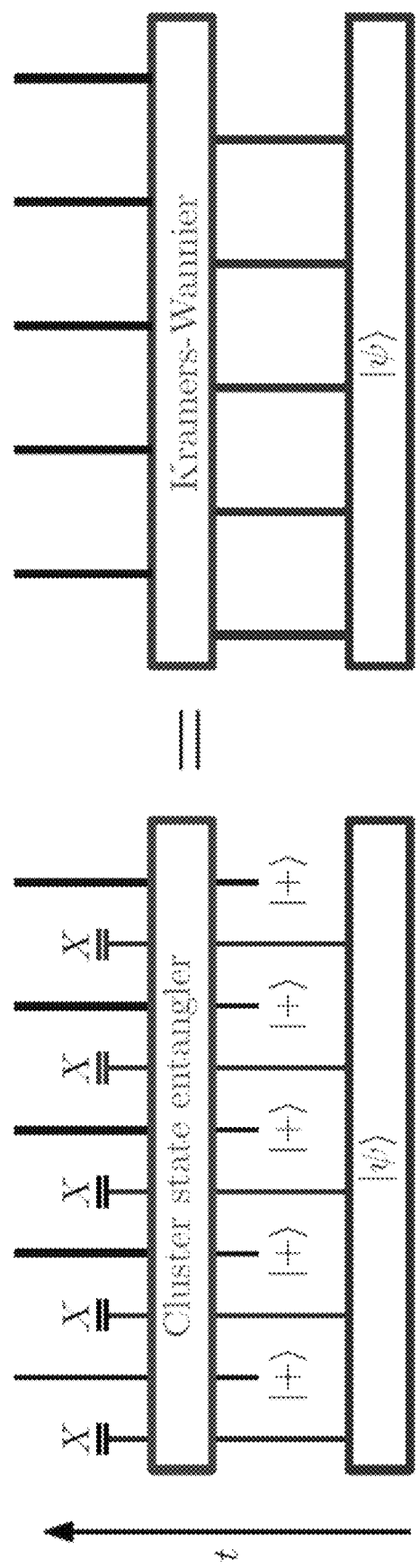
FIG. 29 depicts the protocol to perform the Kramers-Wannier duality using finite-time unitary evolution and measurements, up to single-site rotations. The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The protocol disclosed herein applies to arbitrary initial states, the claim being that by applying the Ising time-evolution discussed in the main text and subsequently measuring the A sublattice will leave the remaining B sites in the Kramers-Wannier transformation of the initial state. (The special case of the initial state being a product state gives many of the examples discussed above, and the special case of the initial state being Z3 top order gives us S3 top order as discussed above.) This general procedure is outlined in a circuit picture in FIG. 29. The essential reason for why this works is as follows. First, note that after measuring the A sites, the cluster entangler can be interpreted as creating the cluster state on the red sites (top left of circuit picture) and blue sites (bottom right of circuit picture). The remaining claim is now that this tensor network (by interpreting certain legs as input and the other legs as output) effectively encodes the Kramers-Wannier transformation. For clarify, consider the 1D case, although the explanation readily generalizes to cluster states defined on bipartite lattices in all dimensions.

Consider a one-dimensional lattice of 2N qubits. Identify two sublattices A and B corresponding to the odd and even sites of the lattice, respectively. The 1D cluster state can be expressed using a Matrix Product State (MPS) as $$|\psi\rangle = \sum_{\{s\}} Tr[C^{s_1} C^{s_2} \ldots C^{s_{2N}}]|s_1, s_2, \ldots, s_{2N}\rangle \quad \text{Equation 89}$$

where $s_n=0,1$ are Z-basis states and the tensor C is defined as $$C = \frac{1}{\sqrt{2}}\begin{pmatrix} \langle 0| & \langle 0| \\ \langle 1| & -\langle 1| \end{pmatrix} \quad \text{Equation 90}$$

To turn this into a Matrix Product Operator (MPO), first double the unit cell to get an MPS with double the physical legs.

$$C \otimes C = \begin{pmatrix} \langle 0+| & \langle 1-| \\ \langle 0-| & \langle 1+| \end{pmatrix} \quad \text{Equation 91}$$

Flipping the leg of the first entry upwards yields the MPO $$\sigma = \begin{pmatrix} |0\rangle\langle+| & |1\rangle\langle-| \\ |0\rangle\langle-| & |1\rangle\langle+| \end{pmatrix} \quad \text{Equation 92}$$

This is exactly the Kramers-Wannier duality. For example, plugging in the 1+) product state, one gets the MPS for the GHZ state $$\begin{pmatrix} \langle 0| & 0 \\ 0 & \langle 1| \end{pmatrix} \quad \text{Equation 93}$$

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of preparing an entangled state of a plurality of qubits, the method comprising:
   preparing an array of qubits, each qubit being in a ground qubit state and having an excited qubit state, the array comprising:
      a plurality of first qubits and a plurality of second qubits, each first qubit disposed at a vertex of a first lattice, each second qubit disposed at a vertex of a second lattice, wherein each first qubit has at least one nearest neighbor second qubit, wherein for any two first qubits, a spacing between said first qubits and their respective nearest neighbor second qubits is the same;
   causing a first single-site rotation of the plurality of the first qubits and of the plurality of the second qubits, thereby causing each first and each second qubit to transition into a superposition of the ground qubit state and the excited qubit state;
   evolving the array of qubits for a pre-determined time τ, thereby producing a cluster state of the array of qubits; and
   measuring the state of each first qubit, wherein the measuring comprises reversing the single-site rotation of the plurality of the first qubits, thereby preparing an entangled state of the plurality of second qubits.

2. The method of claim 1, further comprising:
   prior to measuring the state of each first qubit, selecting either one or more of the first qubits or one or more of the second qubits; and
   causing the first single-site rotation of the selected qubits to exchange the ground and the excited states.

3. The method of claim 1, further comprising:
   selecting one or more of the second qubits; and
   causing the first single site rotation of each selected second qubit,
   thereby preparing a Greenberger-Horne-Zeilinger (GHZ) state.

4. The method of claim 1, wherein preparing the array of qubits comprises:

arranging a plurality of first particle, each first particle corresponding to a first qubit, and plurality of second particles, each second particles corresponding to a second qubit.

5. The method of claim 4, wherein the particles are atoms and the excited state is a Rydberg state.

6. The method of claim 5, wherein each first particle and each second particle is an atom of an element selected from Rb or Cs, provided that the element of the first particle is different from the element of the second particle.

7. The method of claim 6, wherein each first particle is a Rb atom, and each second particle is a Cs atom.

8. The method of claim 5, a time $\tau$ that is inversely proportional to the value of a Rydberg potential at a distance that is the spacing between any first particle and its nearest neighbor second particle.

9. The method of claim 1, further comprising:
preparing a second array of qubits, the second array comprising the plurality of second qubits, the second qubits being in the entangled state, and a plurality of third qubits, each third qubit having a ground state and an excited state, each third qubit being in a ground state, wherein:
each second qubit disposed at a vertex of the second lattice, each third qubit is disposed at a vertex of a third lattice, wherein each second qubit has at least one nearest neighbor third qubit, wherein for any two second qubits, a spacing between said second qubits and their respective nearest neighbor third qubits is the same;
causing a second single-site rotation of the plurality of the second qubits and the third single-site rotation of the plurality of the third qubits, thereby causing each third qubit to transition into a superposition of the ground qubit state and the excited qubit state;
evolving the second array of qubits for a pre-determined time $\tau 1$, thereby producing an entangled state of the plurality of the second qubits and the plurality of the third qubits; and
measuring the state of each second qubit, wherein the measuring comprises reversing the first single-site rotation of the plurality of the second qubits, thereby preparing an entangled state of the plurality of third qubits.

10. The method of claim 9, wherein preparing the array of qubits comprises:
arranging a plurality of first particle, each first particle corresponding to a first qubit, and plurality of second particles, each second particles corresponding to a second qubit, and
wherein preparing the second array of qubits further comprises arranging a plurality of third particles, each third particle corresponding to a third qubit.

11. The method of claim 10, wherein the third particles are atoms and the excited state is a Rydberg state.

12. The method of claim 11, wherein each second particle and each third particle is an atom of an element selected from Rb or Cs, provided that the element of the second particle is different from the element of the third particle.

13. A method of preparing an entangled state of a plurality of qubits, the method comprising:
preparing an array of qubits, each qubit having a first state and a second state, the array comprising:
a plurality of first qubits and a plurality of second qubits, wherein each first qubit has at least one neighboring second qubit, wherein each first qubit is controllably in communication with its respective neighboring second qubits;
causing each second qubit to transition into a superposition of the first state and the second state, thereby preparing a product state;
applying a controlled-Z gate to each of the first qubits and its nearest neighbor second qubit; and
measuring the state of each first qubit, thereby preparing an entangled state of the plurality of second qubits.

14. The method of claim 13, wherein:
each first qubit disposed at a vertex of a first lattice, each second qubit disposed at a vertex of a second lattice, wherein each first qubit has at least one nearest neighbor second qubit;
for any two first qubits, a spacing between said first qubits and their respective nearest neighbor second qubits is the same; and
each first qubit has an Ising interaction with its nearest neighbor second qubit, and wherein applying the controlled-Z gate comprises evolving the array of qubits for a predetermined time $\tau$.

15. The method of claim 13, wherein:
each first qubit is controllably electromagnetically coupled with its respective neighboring second qubits; and
wherein applying the controlled-Z gate comprises electromagnetically inducing an effective Ising interaction pairwise between each first qubit and its nearest neighbor second qubit.

16. The method of claim 15, wherein the time $\tau$ that is inversely proportional to the value of a Rydberg potential at a distance that is a spacing between any first qubit and its nearest neighbor second qubit.

17. A method of preparing an entangled state of a plurality of qubits, the method comprising:
preparing an array of qubits, each qubit having a ground qubit state and an excited qubit state, the array comprising:
a plurality of first qubits and a plurality of second qubits, each first qubit disposed at a vertex of a first lattice, each second qubit disposed at a vertex of a second lattice, wherein each first qubit has at least one nearest neighbor second qubit, wherein for any two first qubits, a spacing between said first qubits and their respective nearest neighbor second qubits is the same, wherein the plurality of the first qubits is in an "input" state, and each of the plurality of second qubits is in the ground state;
causing a single-site rotation of the plurality of the second qubits, thereby causing each second qubit to transition into a superposition of the ground qubit state and the excited qubit state;
evolving the array of qubits for a pre-determined time $\tau$, thereby producing an entangled state of the plurality of the first qubits and the plurality of the second qubits; and
measuring the state of each first qubit, wherein the measuring comprises applying a second single-site rotation of the plurality of the first qubits, thereby preparing an output state of the plurality of the second qubits.

18. A device, comprising an array of qubits, each qubit having a ground qubit state and having an excited qubit state, the array comprising:
a plurality of first qubits and a plurality of second qubits, each first qubit disposed at a vertex of a first lattice, each second qubit disposed at a vertex of a second lattice, wherein each first qubit has at least one nearest neighbor second qubit, wherein for any two first qubits, a spacing between said first qubits and their respective nearest neighbor second qubits is the same;
wherein at least some of the plurality of second qubits is in a GHZ state, and the fidelity of the Greenberger-Horne-Zeilinger (GHZ) state per site is at least 0.99.

19. The device of claim 18, wherein each first qubit is encoded by a first particle, and each second qubit is encoded by a second particle.

20. The device of claim 19, wherein the particles are atoms and the excited state is a Rydberg state.

21. The device of claim 20, wherein each first particle and each second particle is an atom of an element selected from Rb or Cs, provided that the element of the first particle is different from the element of the second particle.

22. The device of claim 20, wherein each first particle is a Rb atom, and each second particle is a Cs atom.

* * * * *